United States Patent
Kubota et al.

(10) Patent No.: US 12,388,383 B2
(45) Date of Patent: Aug. 12, 2025

(54) CONTROLLER FOR ROTARY ELECTRIC MACHINE

(71) Applicant: Mitsubishi Electric Corporation, Tokyo (JP)

(72) Inventors: Naotaka Kubota, Tokyo (JP); Yuya Hisano, Tokyo (JP); Akira Furukawa, Tokyo (JP); Ko Kayahara, Tokyo (JP); Masahiko Tanaka, Tokyo (JP); Akitoshi Harada, Tokyo (JP); Naoya Natori, Tokyo (JP); Kenichi Akita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 18/283,941

(22) PCT Filed: May 11, 2021

(86) PCT No.: PCT/JP2021/017836
§ 371 (c)(1),
(2) Date: Sep. 25, 2023

(87) PCT Pub. No.: WO2022/239098
PCT Pub. Date: Nov. 17, 2022

(65) Prior Publication Data
US 2024/0171100 A1    May 23, 2024

(51) Int. Cl.
*H02P 21/14* (2016.01)
*H02P 21/22* (2016.01)
*H02P 27/08* (2006.01)

(52) U.S. Cl.
CPC ............. *H02P 21/14* (2013.01); *H02P 21/22* (2016.02); *H02P 27/08* (2013.01)

(58) Field of Classification Search
CPC .. H02P 21/00; H02P 21/0003; H02P 21/0089; H02P 21/14; H02P 21/20;
(Continued)

(56) References Cited

U.S. PATENT DOCUMENTS

2008/0147949 A1    6/2008 Miyake
2013/0334995 A1    12/2013 Kuroda
(Continued)

FOREIGN PATENT DOCUMENTS

JP    2007-274849 A    10/2007
JP    4496205 B2    7/2010
(Continued)

OTHER PUBLICATIONS

International Search Report for PCT/JP2021/017836 dated Jul. 13, 2021 [PCT/ISA/210].
(Continued)

*Primary Examiner* — Antony M Paul
(74) *Attorney, Agent, or Firm* — Sughrue Mion, PLLC

(57) ABSTRACT

To provide a controller for rotary electric machine which can determine an abnormality of a calculation unit which calculates voltage command values on a rotating coordinate system of d-axis and q-axis by other arithmetic processors, without adding a new arithmetic processor for abnormality detection, in a controller which controls a rotary electric machine using a plurality of arithmetic processors. The second arithmetic processor calculates voltage command values for control on rotating coordinate system of d-axis and q-axis, based on current command values acquired from the first arithmetic processor; and the first arithmetic processor calculates voltage command values for determination on rotating coordinate system of d-axis and q-axis, based on the current command values, and determines whether or not abnormality occurred in the second arithmetic processor, by
(Continued)

comparing the voltage command values for control acquired from the second arithmetic processor with the voltage command values for determination.

18 Claims, 11 Drawing Sheets

(58) Field of Classification Search
CPC .......... H02P 21/22; H02P 21/30; H02P 23/00; H02P 23/0004; H02P 23/07; H02P 23/14; H02P 25/022; H02P 25/062; H02P 25/22; H02P 27/04; H02P 27/06; H02P 27/08; H02P 29/024; H02P 6/28; B60L 3/0061; B62D 5/0481; H02M 1/0009; H02M 1/4216; H02M 7/5395
See application file for complete search history.

(56) References Cited

U.S. PATENT DOCUMENTS

2019/0356259 A1* 11/2019 Oiwa .................. B62D 5/0481
2020/0255055 A1 8/2020 Takase et al.

FOREIGN PATENT DOCUMENTS

| JP | 5652434 B2 | 1/2015 |
| JP | 5977589 B2 | 8/2016 |

OTHER PUBLICATIONS

Extended European Search Report issued Jun. 24, 2024 in Application No. 21941832.4.

* cited by examiner

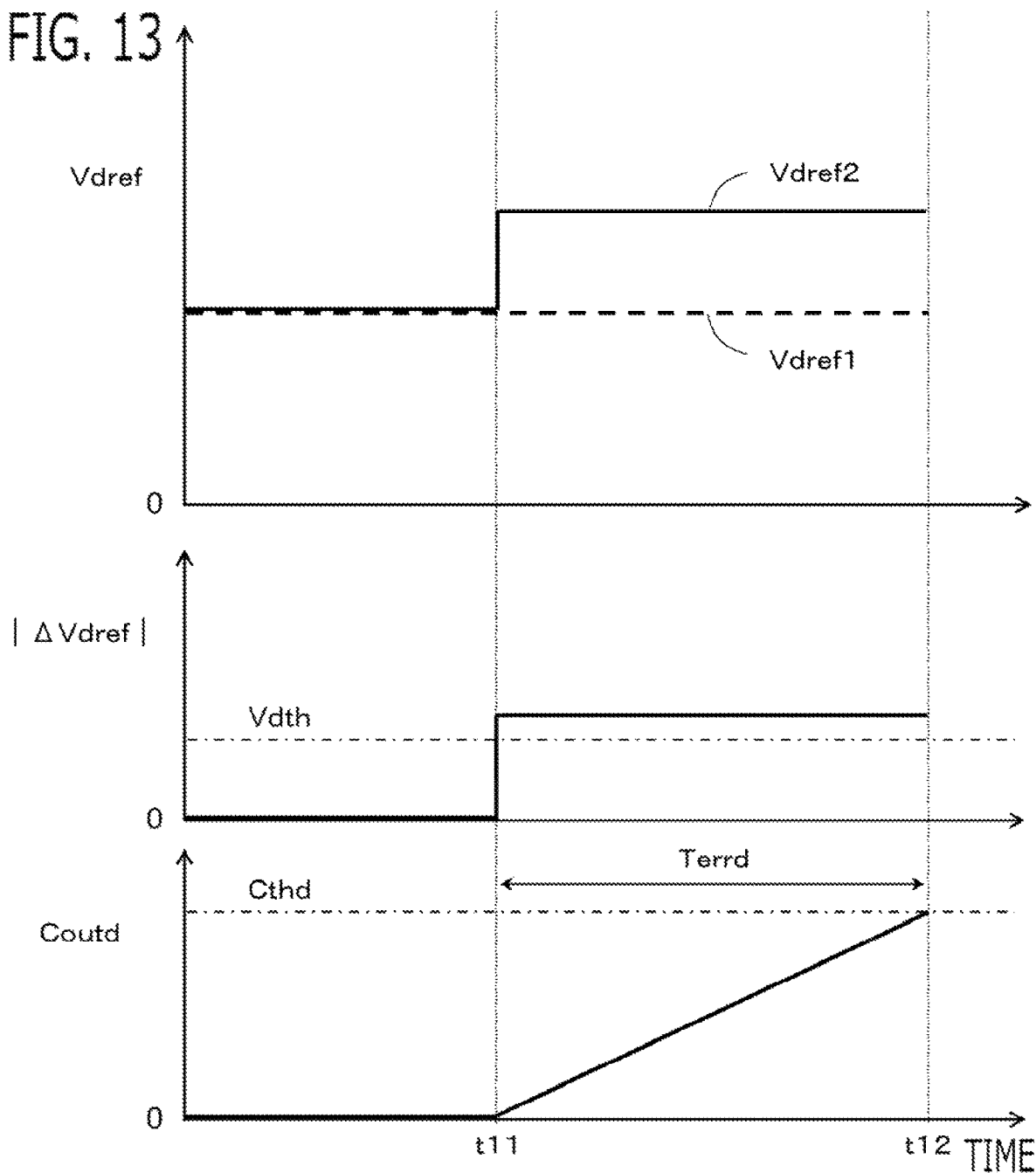

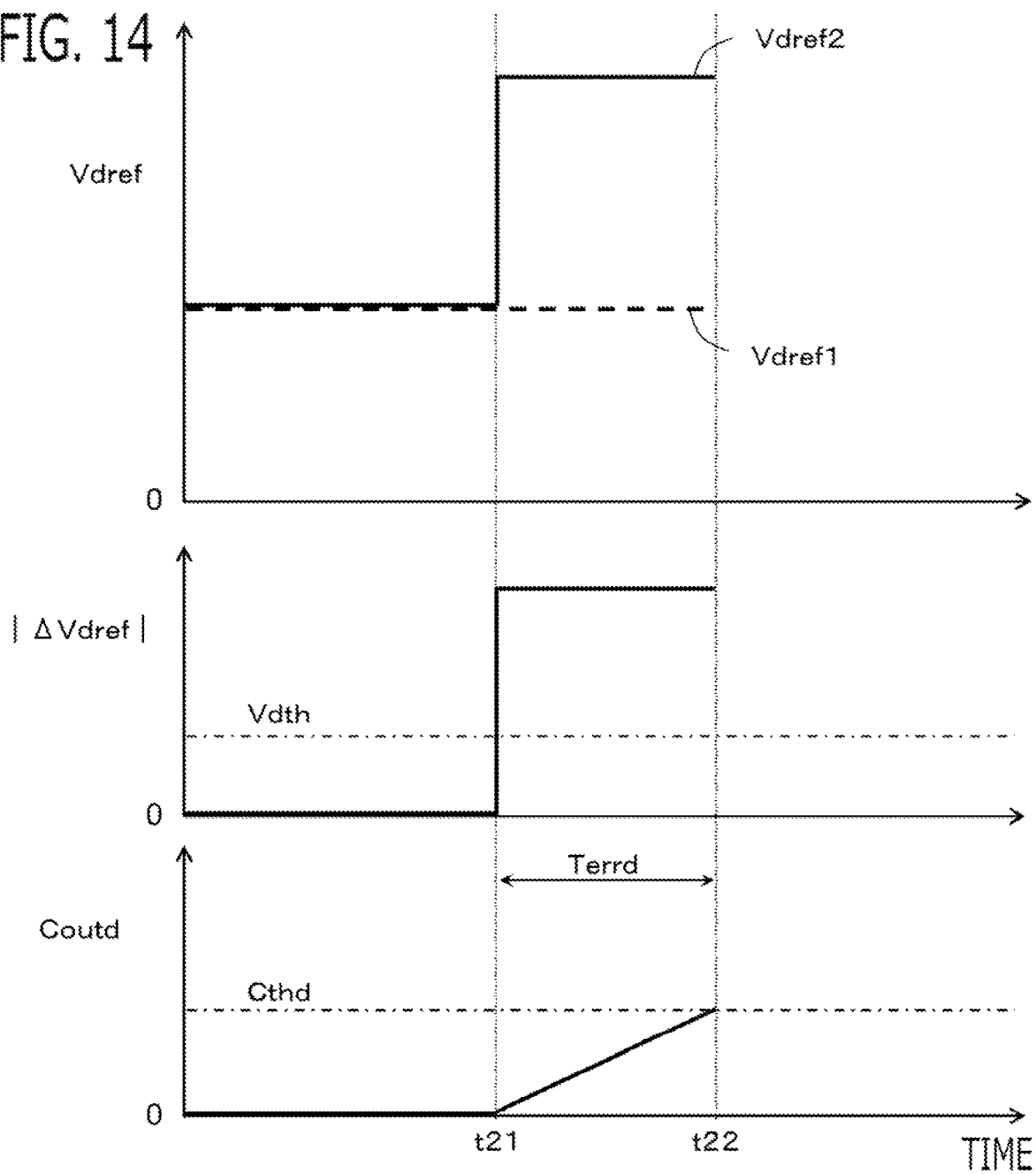

CONTROLLER FOR ROTARY ELECTRIC MACHINE

CROSS REFERENCE TO RELATED APPLICATIONS

This application is a National Stage of International Application No. PCT/JP2021/017836 filed May 11, 2021.

TECHNICAL FIELD

The present disclosure relates to a controller for rotary electric machine.

BACKGROUND ART

Recently, the electric vehicle and the hybrid vehicle which mount the rotary electric machine as the power source of vehicle have been attracting attention due to social demands for low fuel consumption and low exhaust emission. For example, in the hybrid vehicle, the DC power source consisting of the secondary battery and the like is connected to the rotary electric machine via the electric power converter consisting of the inverter and the like. The DC voltage of the DC power source is converted into AC voltage by the inverter to drive the rotary electric machine.

In the controller for rotary electric machine mounted on such hybrid vehicle and electric vehicle, arithmetic processors, such as a microcomputer, process information detected from various sensors, and perform vector control with high current response. In order to realize these processing and vector control, a high-performance microcomputer, and a combination of a plurality of hardwares or software are required.

In the controller for rotary electric machine, since serious influence may be given to the user when failure of various sensors or the microcomputer occurs, it is necessary to detect these failures.

To this problem, in patent document 1, the verification device which is hardware is provided separately from the microcomputer, this verification device performs the same calculation or the simplified calculation in parallel independently from the microcomputer, an internal state is estimated by comparing the calculation outputs between the microcomputer and the verification device, and the abnormality in control calculation of the microcomputer can be detected.

In patent document 2, the software monitoring process is provided inside the microcomputer without using different hardware, and monitors whether or not the control calculation of the microcomputer is performed normally.

CITATION LIST

Patent Literature

Patent document 1: JP 4496205 B
Patent document 2: JP 5652434 B
Patent document 3: JP 5977589 B

SUMMARY OF INVENTION

Technical Problem

In patent document 1, in the actual motor control, it is not sufficient as the safety design just to supervise the estimation of internal state. The cost increases by providing the verification device of the microcomputer for control other than the microcomputer which performs control software successively.

In patent document 2, the abnormality in the control calculation of the microcomputer can be detected without using different hardware. However, since the monitoring is performed by performing equivalent control calculation processing in parallel to the control calculation in one microcomputer, the cost of microcomputer increases.

In patent document 3, in actual application, it is necessary to set the threshold for detection, and the man hour for evaluating in accordance with the motor specification of motor is required.

Then, the purpose of the present disclosure is to provide a controller for rotary electric machine which can determine an abnormality of a calculation unit which calculates voltage command values on a rotating coordinate system of d-axis and q-axis by other arithmetic processors, without adding a new arithmetic processor for abnormality detection, in a controller which controls a rotary electric machine using a plurality of arithmetic processors.

Solution to Problem

A controller for rotary electric machine according to the present disclosure which controls a rotary electric machine having plural-phase armature windings via an electric power converter, the controller for rotary electric machine including:
a first arithmetic processor, and
a second arithmetic processor that communicates with the first arithmetic processor,
wherein the first arithmetic processor is provided with a control parameter calculation unit that calculates current command values on a rotating coordinate system of d-axis and q-axis which rotates synchronizing with rotation of a rotor of the rotary electric machine in an electrical angle,
wherein the second arithmetic processor is provided with a voltage command value calculation unit for control that calculates voltage command values for control on the rotating coordinate system of d-axis and q-axis, based on the current command values acquired from the first arithmetic processor by communication, and
wherein the first arithmetic processor is provided with a voltage command value calculation unit for determination which calculates voltage command values for determination on the rotating coordinate system of d-axis and q-axis, based on the current command values; and an abnormality determination unit that compares the voltage command values for control acquired from the second arithmetic processor by communication, with the voltage command values for determination, and determines whether or not an abnormality occurred in the voltage command value calculation unit for control.

Advantage of Invention

Since the voltage command value calculation unit for determination and the abnormality determination unit are provided in the first arithmetic processor which is provided with the control parameter calculation unit which calculates the current command values on the rotating coordinate system of d-axis and q-axis, the abnormality of the voltage command value calculation unit for control which calculates the voltage command values for control on the rotating coordinate system of d-axis and q-axis can be determined by other first arithmetic processors, without adding a new arithmetic processor for abnormality detection. Since the abnormality is determined using the voltage command values on the rotating coordinate system of d-axis and q-axis which are DC components, it is not necessary to determine the abnormality at a calculation period shorter than the AC period, and the abnormality of the voltage command value calculation unit for control can be determined, without accelerating the calculation period of the first arithmetic processor.

BRIEF DESCRIPTION OF THE DRAWINGS

FIG. 13 is a time chart for explaining the abnormality determination behavior according to Embodiment 3; and FIG. 14 is a time chart for explaining the abnormality determination behavior according to Embodiment 3.

DETAILED DESCRIPTION OF THE EMBODIMENTS

1. Embodiment 1

Figure 1:
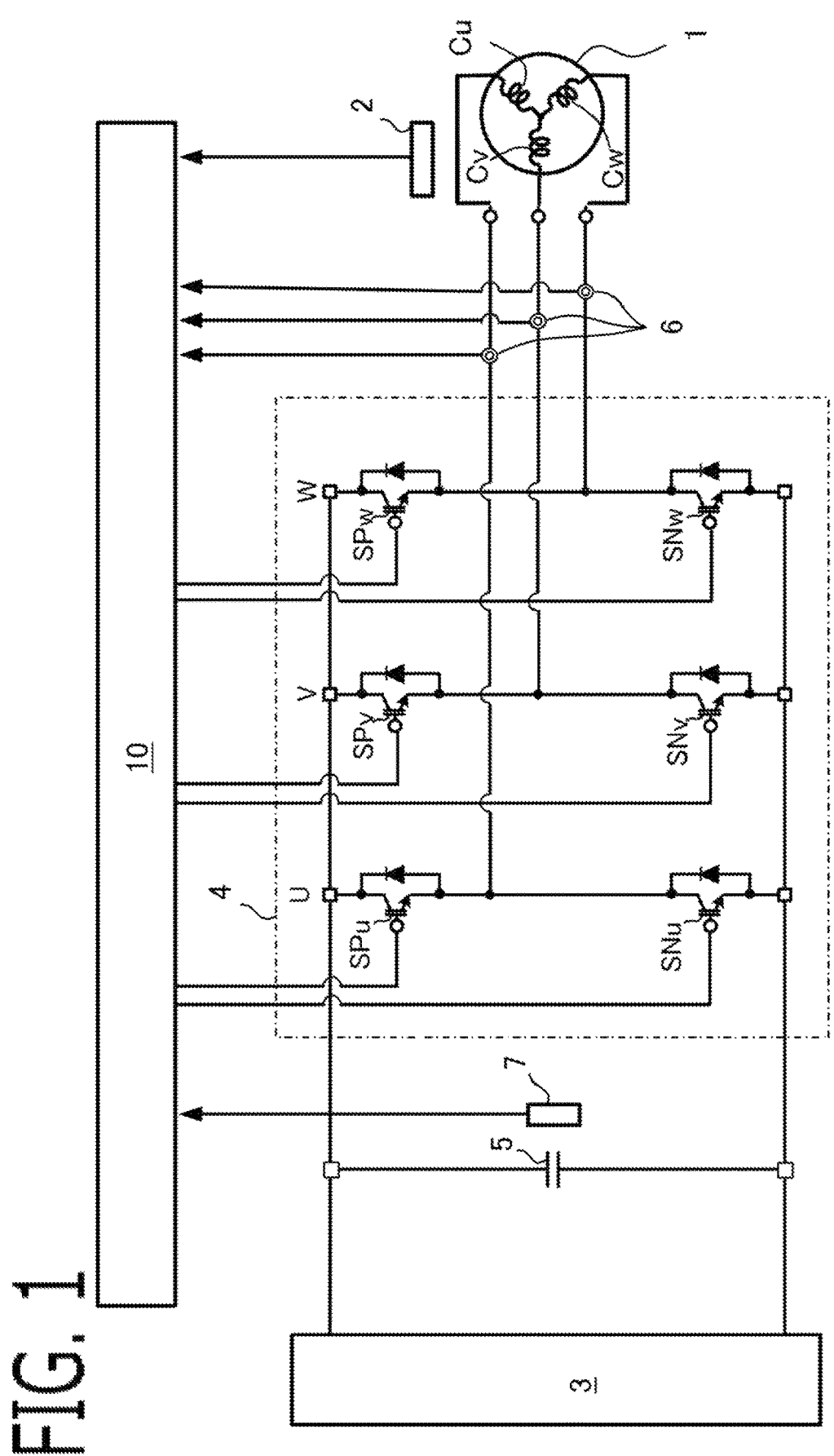
FIG. 1 is a schematic configuration diagram of the rotary electric machine, the electric power converter, and the controller according to Embodiment 1.

A controller for rotary electric machine 10 (hereinafter, referred to simply as the controller 10) according to Embodiment 1 will be explained with reference to drawings. FIG. 1 is a schematic configuration diagram of a rotary electric machine 1, an electric power converter 4, and the controller 10 according to the present embodiment.

1-1. Rotary Electric Machine 1

The rotary electric machine 1 is provided with a stator and a rotor disposed on the radial-direction inner side of the stator. The stator is provided with plural-phase armature windings (in this example, three-phase armature windings Cu, Cv, Cw of U phase, V phase, and W phase). The rotary electric machine 1 is a permanent magnet type synchronous rotary electric machine in which the permanent magnet is provided in the rotor. The three-phase armature windings may be connected by star connection, or may be connected by Δ connection.

The rotor is provided with a rotation sensor 2 for detecting a rotational angle of the rotor. Resolver, encoder, or MR sensor is used for the rotation sensor 2. An output signal of the rotation sensor 2 is inputted into the controller 10. As described later, the rotation sensor 2 may not be provided, but it may be a configuration of sensorless in which the angle is estimated based on current information.

1-2. Electric Power Converter 4

As the electric power converter 4, an inverter is used. As the electric power converter 4, an electric power converter other than the inverter, for example, a matrix converter, may be used.

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to each phase of three phases. A connection node of two switching devices in the series circuit of each phase is connected to the armature winding of the corresponding phase.

Specifically, in the series circuit of U phase, the positive electrode side switching device SPu of U phase and the negative electrode side switching device SNu of U phase are connected in series, and the connection node of two switching devices is connected to the armature winding Cu of U phase. In the series circuit of V phase, the positive electrode side switching device SPv of V phase and the negative electrode side switching device SNv of V phase are connected in series, and the connection node of two switching devices is connected to the armature winding Cv of V phase. In the series circuit of W phase, the positive electrode side switching device SPw of W phase and the negative electrode side switching device SNw of W phase are connected in series, and the connection node of two switching devices is connected to the armature winding Cw of W phase. A smoothing capacitor 5 is connected between the positive electrode side and the negative electrode side of the DC power source 3.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 10 via a gate drive circuit and the like. The each switching device is turned on or turned off by the switching signal outputted from the controller 10.

The DC power source 3 outputs a DC voltage Vdc to the inverter 4. The DC power source 3 may be any apparatus which outputs the DC voltage Vdc, such as a battery, a DC-DC converter, a diode rectifier, and a PWM rectifier. A voltage sensor 7 which detects a DC voltage Vdc supplied to the inverter 4 from the DC power source 3 is provided. The voltage sensor 7 is connected in parallel with the DC power source 3. The output signal of the voltage sensor 7 is inputted into the controller 10.

A current sensor 6 which detects current which flows into the armature winding of each phase is provided. The current sensors 6 is a current sensor, such as shunt resistance or Hall element. An output signal of the current sensor 6 is inputted into the controller 10.

In the present embodiment, the current sensor 6 is provided on a wire which connects the series circuit of two switching devices of each phase, and the coil of each phase. The current sensor 6 may be provided in the series circuit of two switching devices of each phase. Alternatively, the current sensor 6 may be provided on the wire which connects the inverter 4 and the DC power source 3, and the current of the armature winding of each phase may be detected by well-known "bus line one-shunt system."

1-4. Controller 10

Figure 2:
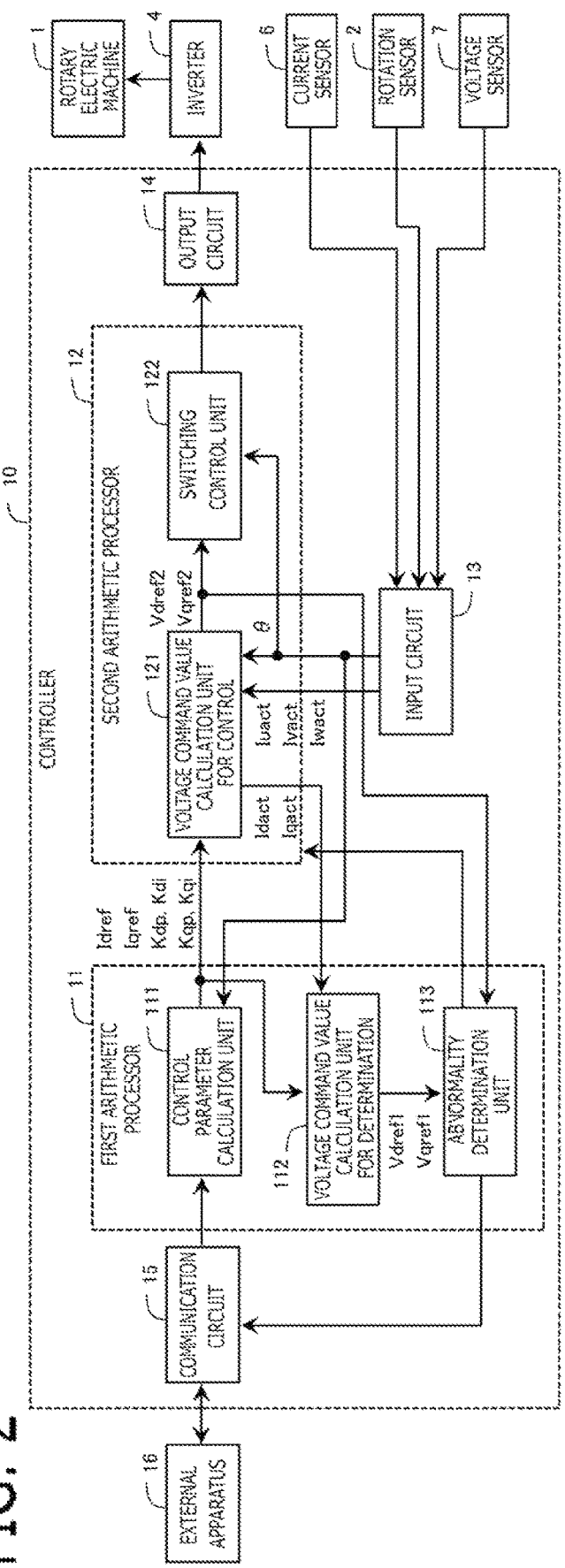
FIG. 2 is a schematic block diagram of the controller according to Embodiment 1.

The controller 10 controls the rotary electric machine 1 via the inverter 4. As shown in FIG. 2, the controller 10 is provided with a first arithmetic processor 11 and a second arithmetic processor 12. The first arithmetic processor 11 and the second arithmetic processor 12 communicate with each other. In the present embodiment, the controller 10 is provided with an input circuit 13, an output circuit 14, and a communication circuit 15. The input circuit 13 communicates with the first arithmetic processor 11 and the second arithmetic processor 12. The output circuit 14 communicates with the second arithmetic processor 12. The communication circuit 15 communicates with the first arithmetic processor 11. For communication between each apparatus and each circuit, serial communication or parallel communication, such as a serial peripheral interface, is used.

The first arithmetic processor 11 is provided with a control parameter calculation unit 111, a voltage command value calculation unit for determination 112, an abnormality determination unit 113, and the like. The second arithmetic processor 12 is provided with a voltage command value calculation unit for control 121, a switching control unit 122, and the like.

Figure 3:
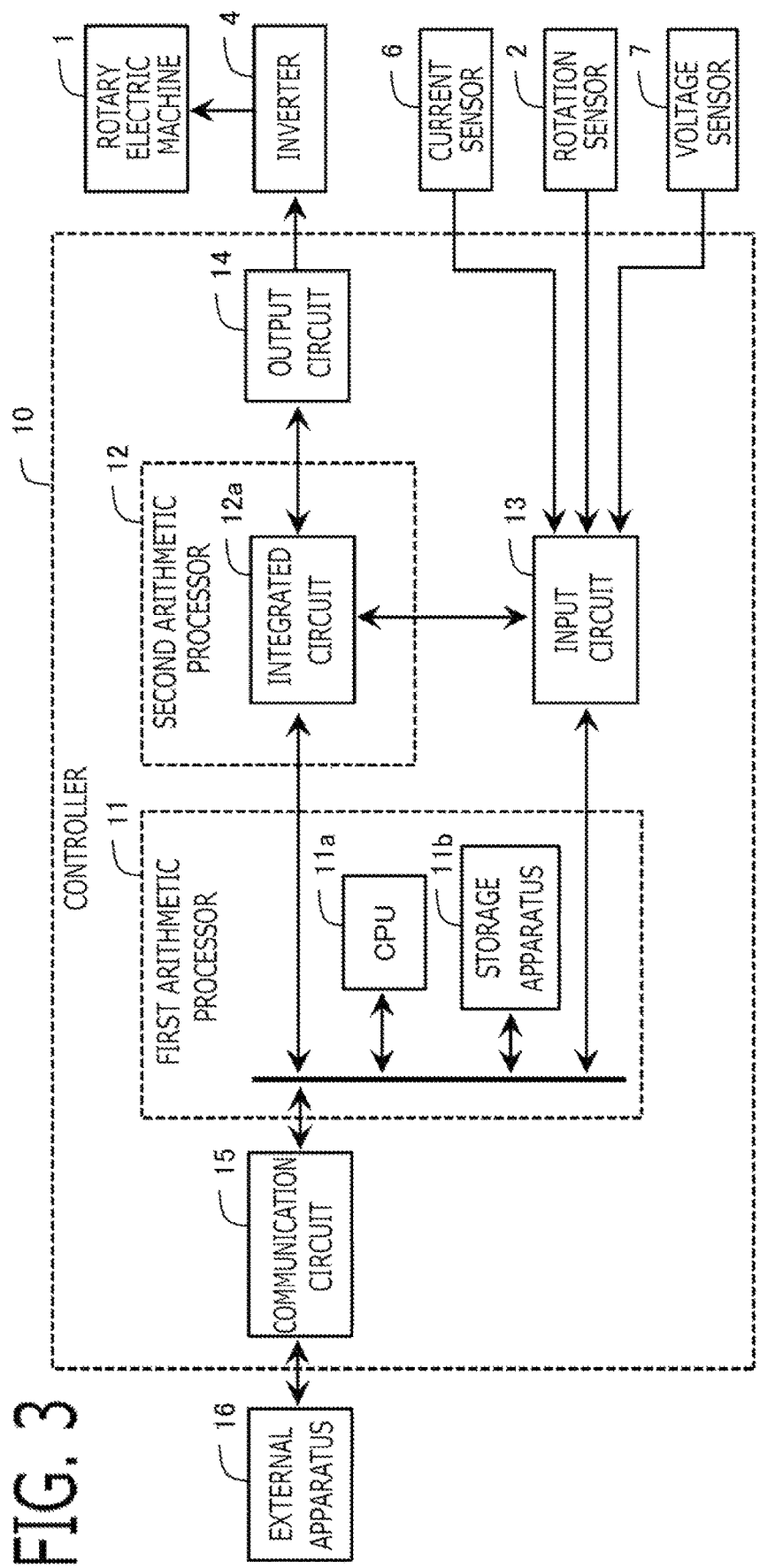
FIG. 3 is a hardware configuration diagram of the controller according to Embodiment 1.

Each function of the processing units 111 to 113 of the first arithmetic processor 11 is realized by processing circuits provided in the first arithmetic processor 11. In the present embodiment, as shown in FIG. 3, the first arithmetic processor 11 is provided with CPU 11a (Central Processing Unit), a storage apparatus 11b, and the like, as the processing circuits. As the storage apparatus 11b, RAM (Random Access Memory), ROM (Read Only Memory), EEPROM (Electrically Erasable Programmable ROM), and the like are provided. CPU 11a runs software (programs) stored in the storage apparatus 11b, such as ROM and EEPROM, and collaborates with other hardware such as the storage apparatus 11b, the communication circuit 15, the input circuit 13, the second arithmetic processor 12 and the like, so that each function of each processing unit 111 to 113 is realized. Setting data items, such as the current command values, the control gains, the determination value Vth, the determination time Terr, and the counter determination value Cth to be used in each processing unit 111 to 113 are stored in the storage apparatus 11b, such as ROM and EEPROM, as part of software (program).

Each function of the processing units 121, 122 of the second arithmetic processor 12 is realized by processing circuits provided in the second arithmetic processor 12. In the present embodiment, as shown in FIG. 3, the second arithmetic processor 12 is provided with an integrated circuit 12a for particular applications, such as ASIC (Application Specific Integrated Circuit) and FPGA (Field Programmable Gate Array), as the processing circuit. The second arithmetic processor 12 performs hardware processing, and collaborates with other hardwares, such as the input circuit 13, the output circuit 14, and the first arithmetic processor 11, so that each function of each processing unit 121, 122 is realized.

The first arithmetic processor 11 and the second arithmetic processor 12 may be provided with various kinds of logical circuits, various kinds of signal processing circuits, and the like, as peripheral processing circuits.

The input circuit 13 is connected with various kinds of sensors, such as the current sensor 6, the rotation sensor 2, and the voltage sensor 7, and is provided with A/D converter, a communication circuit, and the like for acquiring output signals from the sensors. In the present embodiment, the input circuit 13 acquires the output signals of the current sensor 6, the rotation sensor 2, and the voltage sensor 7 according to the command signal transmitted from the second arithmetic processor 12, and transmits the acquired output signal of each sensor to the second arithmetic processor 12. For example, according to the trigger signal transmitted from the second arithmetic processor 12 every second calculation period T2, the output signal of sensor is A/D converted, and an A/D conversion value is transmitted to the second arithmetic processor 12.

The output circuit 14 is provided with a gate driving circuit which drive on/off the switching devices, and the like. A high/low signal outputted from the output port of the second arithmetic processor 12 and the like is inputted into the output circuit 14, and the driving circuit is drove. The communication circuit 15 communicates with an external apparatus 16 according to the command of the first arithmetic processor 11. A communication standard, such as CAN (Controller Area Network) or LIN (Local Interconnect Network) is used for communication with the outside.

Figure 4:
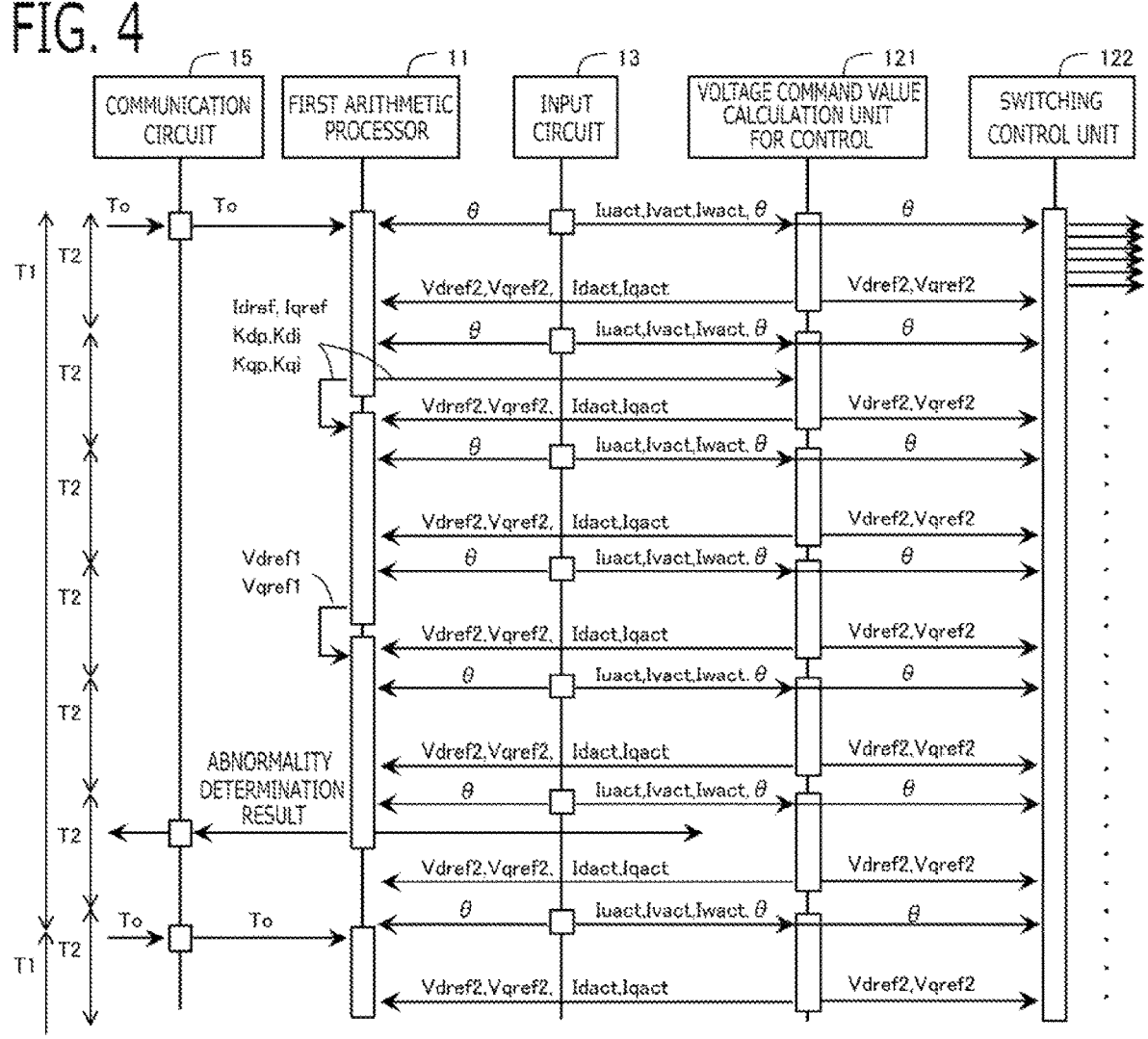
FIG. 4 is a sequence diagram of processing of the controller according to Embodiment 1.

FIG. 4 shows a sequence diagram of each processing of the first arithmetic processor 11 and the second arithmetic processor 12.

1-3-1. Input Circuit 13

According to the trigger signal transmitted from the second arithmetic processor 12, the input circuit 13 acquires the output signal of the current sensor 6, and transmits it to the second arithmetic processor 12. In the present embodiment, according to the trigger signal transmitted from the second arithmetic processor 12 every second calculation period T2, the input circuit 13 A/D converts the output signal of the current sensor 6 expressing the current value of each phase, and transmits an A/D conversion value of the current signal of each phase to the second arithmetic processor 12.

According to the trigger signal transmitted from the second arithmetic processor 12, the input circuit 13 acquires the output signal of the rotation sensor 2, and transmits it to the second arithmetic processor 12. In the present embodiment, according to the trigger signal transmitted from the second arithmetic processor 12 every second calculation period T2, the input circuit 13 A/D converts the output signal of the rotation sensor 2 expressing the rotational angle, and transmits an A/D conversion value of the angle signal to the second arithmetic processor 12. The input circuit 13 transmits the output signal of the rotation sensor 2 to the first arithmetic processor 11.

According to the trigger signal transmitted from the second arithmetic processor 12, the input circuit 13 acquires the output signal of the voltage sensor 7, and transmits it to the second arithmetic processor 12. In the present embodiment, according to the trigger signal transmitted from the second arithmetic processor 12 every second calculation period T2, the input circuit 13 A/D converts the output signal of the voltage sensor 7 expressing the DC voltage Vdc, and transmits the A/D conversion value of a voltage signal to the second arithmetic processor 12. The input circuit 13 transmits the output signal of the voltage sensor 7 to the first arithmetic processor 11.

1-3-2. Control Parameter Calculation Unit 111

The control parameter calculation unit 111 calculates current command values on a rotating coordinate system of d-axis and q-axis which rotates synchronizing with rotation of the rotor of the rotary electric machine in the electrical angle. The control parameter calculation unit 111 calculates the current command values every first calculation period T1, and transmits these to the voltage command value calculation unit for control 121 of the second arithmetic processor 12. The first calculation period T1 is longer than the second calculation period T2.

The d-axis is defined in the direction of the magnetic pole (the N pole) of the rotor, and the q-axis is defined in the direction advanced to the d-axis by 90 degrees in the electrical angle. For example, the control parameter calculation unit 111 calculates a current command value of d-axis Idref and a current command value of q-axis Iqref based on a torque command value To, a rotational angle speed ω, and a DC voltage Vdc which were transmitted from the external apparatus 16. Well-known the maximum torque/current control and the magnetic flux weakening control are used for calculation. If the Id=0 control is used, since the current command value of d-axis Idref is 0, only current command value of q-axis Iqref is calculated. The rotational angle speed ω is calculated based on the rotational angle θ transmitted from the input circuit 13. Instead of the torque command value To, other command value, such as a command value of the rotational speed of the rotor and a command value of generation current, may be used.

The control parameter calculation unit 111 calculates control gains. The control parameter calculation unit 111 calculates the control gains every first calculation period T1, and transmits these to the voltage command value calculation unit for control 121 of the second arithmetic processor 12. In the present embodiment, the control gains are a proportional gain of d-axis Kdp, an integral gain of d-axis Kdi, a proportional gain of q-axis Kqp, and an integral gain of q-axis Kqi.

If well-known non-interacting control for non-interfering between d-axis and q-axis is performed in the voltage command value calculation unit for control 121, the control parameter calculation unit 111 calculates the control gains for non-interacting control, based on the rotational angle speed ω and the like every first calculation period T1, and transmits these to the voltage command value calculation unit for control 121 of the second arithmetic processor 12.

1-3-3. Voltage Command Value Calculation Unit for Control 121

The voltage command value calculation unit for control 121 calculates the voltage command values for control on the rotating coordinate system of d-axis and q-axis, based on the current command values acquired from the first arithmetic processor 11 (the control parameter calculation unit 111) by communication. The voltage command value calculation unit for control 121 calculates the voltage command values for control every second calculation period T2.

The voltage command value calculation unit for control 121 transmits a trigger signal to the input circuit 13 every second calculation period T2, and acquires information of the detection values of currents Iuact, Ivact, Iwact which flow into the three-phase armature windings, the rotational angle θ, and the DC voltage Vdc, from the input circuit 13. Then, the voltage command value calculation unit for control 121 calculates the current detection values on the rotating coordinate system of d-axis and q-axis, based on the current detection values Iuact, Ivact, Iwact of the three-phase armature windings, and the rotational angle θ in the electrical angle of the rotor every second calculation period T2. Specifically, the voltage command value calculation unit for control 121 performs well-known the three-phase/two-phase conversion and the rotating coordinate conversion to the current detection values Iuact, Ivact, Iwact of the three-phase armature windings, based on the rotational angle θ, and converts into the current detection value of d-axis Idact and the current detection value of q-axis Iqact.

The current sensor 6 may detect the winding currents of two-phase armature windings, and the winding current of the remaining one-phase armature winding may be calculated based on the current detection value of winding currents of two-phase armature windings. For example, the current sensor 6 may detect the currents Ivact, Iwact of V phase and W phase armature windings, and the current Iuact of U phase armature winding may be calculated by Iuact=−Ivact−Iwact.

The voltage command value calculation unit for control 121 transmits the calculated current detection values to the first arithmetic processor 11 (the voltage command value calculation unit for determination 112) every second calculation period T2 (or the first calculation period T1).

Then, the voltage command value calculation unit for control 121 calculates the voltage command values for control, based on the current detection values and the current command values acquired from the first arithmetic processor 11 (the control parameter calculation unit 111) by communication every second calculation period T2. At this time, the voltage command value calculation unit for control 121 calculates the voltage command values for control using the control gains acquired from the first arithmetic processor 11 (the control parameter calculation unit 111) by communication. If well-known non-interacting control between d-axis and q-axis is performed, the voltage command value calculation unit for control 121 calculates non-interacting control values, based on the control gains for non-interacting control and the current detection values which were acquired from the first arithmetic processor 11 (the control parameter calculation unit 111) by communication, and corrects the voltage command values for control by the non-interacting control values. Since the current command values and the control gains are transmitted every first calculation period T1 which is longer than the second calculation period T2, the current command values and the control gains which were transmitted most newly are used.

The voltage command value calculation unit for control 121 calculates the voltage command values for control, at least based on the integration values for control obtained by performing integral calculations to deviations between the current detection values and the current command values. In the present embodiment, about each of current of d-axis and current of q-axis, PI control is performed.

Specifically, as shown in the next equation, the voltage command value calculation unit for control 121 calculates a current deviation for control of d-axis $\Delta Id2$ between the current command value of d-axis Idref and the current detection value of d-axis Idact; calculates a proportional term for control of d-axis Vdp2 by multiplying the proportional gain of d-axis Kdp to the current deviation for control of d-axis $\Delta Id2$; calculates an integral term for control of d-axis Vdi2 (n) in the present calculation period (n) by adding a value obtained by multiplying the integral gain of d-axis Kdi and the second calculation period T2 to the current deviation for control of d-axis $\Delta Id2$, to the integral term for control of d-axis Vdi2 (n−1) calculated in the previous calculation period (n−1); and calculates a voltage command value for control of d-axis Vdref2 by adding the proportional term for control of d-axis Vdp2 and the integral term for control of d-axis Vdi2 (n) in the present calculation period.

$$\Delta Id2 = Idref - Idact$$

$$Vdp2 = Kdp \times \Delta Id2$$

$$Vdi2(n) = Kdi \times T2 \times \Delta Id2 + Vdi2(n-1)$$

$$Vdref2 = Vdp2 + Vdi2(n) \tag{1}$$

And, as shown in the next equation, the voltage command value calculation unit for control 121 calculates a current deviation for control of q-axis $\Delta Iq2$ between the current command value of q-axis Iqref and the current detection value of q-axis Idact; calculates a proportional term for control of q-axis Vqp2 by multiplying the proportional gain of q-axis Kqp to the current deviation for control of q-axis $\Delta Iq2$; calculates an integral term for control of q-axis Vqi2 (n) in the present calculation period (n) by adding a value obtained by multiplying the integral gain of q-axis Kqi and the second calculation period T2 to the current deviation for control of q-axis $\Delta Iq2$, to the integral term for control of q-axis Vqi2 (n−1) calculated in the previous calculation period (n−1); and calculates a voltage command value for control of q-axis Vqref2 by adding the proportional term for control of q-axis Vqp2 and the integral term for control of q-axis Vqi2 (n) in the present calculation period.

$$\Delta Iq2 = Iqref - Iqact$$

$$Vqp2 = Kqp \times \Delta Iq2$$

$$Vqi2(n) = Kqi \times T2 \times \Delta Iq2 + Vqi2(n-1)$$

$$Vqref2 = Vqp2 + Vqi2(n) \quad (2)$$

The voltage command value calculation unit for control 121 transmits the calculated voltage command values for control to the first arithmetic processor 11 (the abnormality determination unit 113) every second calculation period T2 (or the first calculation period T1). As described later, the integral terms for control of d-axis and q-axis Vdi2 (n−1), Vqi2 (n−1) calculated in the previous calculation period may be included in the voltage command values for control to be transmitted.

1-3-4. Switching Control Unit 122

The switching control unit 122 turns on and off the plurality of switching devices provided in the inverter 4, based on the voltage command values for control.

The switching control unit 122 converts the voltage command value for control of d-axis Vdref2 and the voltage command value for control of q-axis Vqref2 into three-phase voltage command values Vuref, Vvref, Vwref, based on the rotational angle θ every second calculation period T2. Specifically, the switching control unit 122 converts the voltage command values for control of d-axis and q-axis Vdref2, Vqref2 into the three-phase voltage command values Vuref, Vvref, Vwref, by performing the fixed coordinate conversion and the two-phase/three-phase conversion based on the rotational angle θ.

The switching control unit 122 may add well-known modulation, such as the two-phase modulation and the third order harmonic wave superimposing, to the three-phase voltage command values Vuref, Vvref, Vwref, in order to improve a voltage utilization factor.

The switching control unit 122 turns on and off the plurality of switching devices provided in the inverter 4, based on the three-phase voltage command values Vuref, Vvref, Vwref. The switching control unit 122 uses well-known the carrier wave comparison PWM or the space vector PWM.

In the case where the carrier wave comparison PWM is used, the switching control unit 122 compares a carrier wave with each of the three-phase voltage command values Vuref, Vvref, Vwref, and turns on and off the plurality of switching devices based on a comparison result. The carrier wave is a triangular wave which oscillates with an oscillation width of the DC voltage Vdc at the second calculation period T2.

In the case where the space vector PWM is used, the switching control unit 122 generates a voltage command vector from the three-phase voltage command values Vuref, Vvref, Vwref; determines an output time allocation of seven basic voltage vectors in the second calculation period T2, based on the voltage command vector; and generates the switching signal which turns on and off each switching device in the second calculation period T2, based on the output time allocation of seven basic voltage vectors.

1-3-5. Voltage Command Value Calculation Unit for Determination

The voltage command value calculation unit for determination 112 calculates voltage command values for determination on the rotating coordinate system of d-axis and q-axis, based on the current command values calculated by the control parameter calculation unit 111.

In the present embodiment, the voltage command value calculation unit for determination 112 calculates the voltage command values for determination every first calculation period T1, based on the current detection values acquired from the second arithmetic processor 12 (the voltage command value calculation unit for control 121) by communication, and the current command values outputted from the control parameter calculation unit 111. According to this configuration, since it is not necessary to calculate the current detection values by the first arithmetic processor 11, the arithmetic processing load can be reduced. Similarly to the voltage command value calculation unit for control 121, the voltage command value calculation unit for determination 112 may calculate the current detection values of d-axis and q-axis, based on the detection values of currents Iuact, Ivact Iwact which flow into the three-phase armature windings acquired from the input circuit 13, and the rotational angle θ.

The voltage command value calculation unit for determination 112 calculates the voltage command values for determination using the control gains outputted from the control parameter calculation unit 111. If the non-interacting control between d-axis and q-axis is performed in the voltage command value calculation unit for control 121, the voltage command value calculation unit for determination 112 calculates the non-interacting control values, based on the control gains for non-interacting control outputted from the control parameter calculation unit 111, and the current detection values; and corrects the voltage command values for determination by the non-interacting control values. Since the current detection values are transmitted every second calculation period T2 which is shorter than the first calculation period T1, the current detection values transmitted most newly are used.

The voltage command value calculation unit for determination 112 calculates the voltage command values for determination, at least based on integration values for determination obtained by performing integral calculations to deviations between the current detection values and the current command values. In the present embodiment, PI control is performed for each of the current of d-axis and the current of q-axis.

Specifically, as shown in the next equation, the voltage command value calculation unit for determination 112 calculates a current deviation for determination of d-axis $\Delta Id1$ between the current command value of d-axis Idref and the current detection value of d-axis Idact; calculates a proportional term for determination of d-axis Vdp1 by multiplying the proportional gain of d-axis Kdp to the current deviation for determination of d-axis $\Delta Id1$, calculates an integral term for determination of d-axis Vdi1 (j) in the present calculation period (j), by adding a value obtained by multiplying an integral gain of d-axis Kdi and the first calculation period T1 to the current deviation for determination of d-axis $\Delta Id1$, to the integral term for determination of d-axis Vdi1 (j−1) calculated in the previous calculation period (j−1); and calculates a voltage command value for determination of d-axis Vdref1 by adding the proportional term for determination of d-axis Vdp1 and the integral term for determination of d-axis Vdi1 (j) in the present calculation period.

$\Delta Id1 = Idref - Idact$ $Vdp1 = Kdp \times \Delta Id1$ $Vdi1(j) = Kdi \times T1 \times \Delta Id1 + Vdi1(j-1)$ $Vdref1 = Vdp1 + Vdi1(j)$ (3)

As shown in the next equation, the voltage command value calculation unit for determination 112 calculates a current deviation for determination of q-axis $\Delta Iq1$ between the current command value of q-axis Iqref and the current detection value of q-axis Idact; calculates a proportional term for determination of q-axis Vqp1 by multiplying a proportional gain of q-axis Kqp to the current deviation for determination of q-axis $\Delta Iq1$; calculates an integral term for determination of q-axis Vqi1 (j) in the present calculation period (j), by adding a value obtained by multiplying an integral gain of q-axis Kqi and the first calculation period T1 to the current deviation for determination of q-axis $\Delta Iq1$, to the integral term for determination of q-axis Vqi1 (j−1) calculated in the previous calculation period (j−1); and calculates a voltage command value for determination of q-axis Vqref1 by adding the proportional term for determination of q-axis Vqp1 and the integral term for determination of q-axis Vqi1 (j) in the present calculation period.

$\Delta Iq1 = Igref - Iqact$ $Vqp1 = Kqp \times \Delta Iq1$ $Vqi1(j) = Kqi \times T1 \times \Delta Iq1 + Vgi1(j-1)$ $Vqref1 = Vqp1 + Vgi1(j)$ (4)

As shown in the equation (1) and the equation (2), in the integral calculation of the voltage command value calculation unit for control 121 performed every second calculation period T2, the integral gain Kdi, Kqi and the second calculation period T2 are multiplied to the current deviation $\Delta Id2$, $\Delta Iq2$. As shown in the equation (3) and the equation (4), in the integral calculation of the voltage command value calculation unit for determination 112 performed every first calculation period T1, the integral gain Kdi, Kqi and the first calculation period T1 are multiplied to the current deviation $\Delta Id1$, $\Delta Iq1$. Accordingly, between the voltage command value calculation units for control 121 and the voltage command value calculation units for determination 112 having different calculation periods with each other, the integral calculations with equivalent response can be performed using the same integral gains Kdi, Kqi. Accordingly, the same control gains can be used between the voltage command value calculation unit for control 121 and the voltage command value calculation unit for determination 112, the control system design can be simplified, and the arithmetic processing load can be reduced.

Alternatively, when a current change is large, due to a difference between the first calculation period T1 and the second calculation period T2, a difference between the integral term for determination of d-axis Vdi1 and the integral term for control of d-axis Vdi2, and a difference between the integral term for determination of q-axis Vqi1 and the integral term for control of q-axis Vqi2 become large, and it may be determined erroneously that abnormality occurred. Then, as mentioned above, the voltage command value calculation unit for control 121 may transmit the integral terms for control of d-axis and q-axis Vdi2 (n−1), Vqi2 (n−1) calculated in the previous calculation period to the first arithmetic processor 11. Then, the voltage command value calculation unit for determination 112 may calculate the voltage command values for determination, at least based on the integration values for control acquired from the voltage command value calculation unit for control 121 by communication. For example, as shown in the next equation, the voltage command value calculation unit for determination 112 may use the integral terms for control of d-axis and q-axis Vdi2 (n−1), Vqi2 (n−1) in the previous calculation period transmitted from the voltage command value calculation unit for control 121 instead of the integral terms for determination of q-axis and d-axis Vdi1 (j−1), Vqi1 (j−1) in the previous calculation period in the equation (3) and the equation (4); may use the second calculation period T2 instead of the first calculation period T1 in the equation (3) and the equation (4); and may calculate the integral terms for determination of q-axis and d-axis Vqi1 (j), Vqi1 (j).

$Vdi1(j) = Kdi \times T2 \times \Delta Id1 + Vdi2(n-1)$ $Vqi1(j) = Kqi \times T2 \times \Delta Iq1 + Vqi2(n-1)$ (5)

When the second calculation period T2 is sufficiently smaller than the first calculation period T1, the term of the second calculation period T2 in the equation (5) may be omitted; and the voltage command value calculation unit for determination 112 may calculate the integral terms for determination of q-axis and d-axis Vqi1 (j), Vqi1 (j), as shown in the next equation.

$T2 \ll T1$ $Vdi1(j) = Vdi2(n-1)$ $Vqi1(j) = Vqi2(n-1)$ (6)

1-3-6. Abnormality Determination Unit 113

The abnormality determination unit 113 compares the voltage command values for control acquired from the second arithmetic processor 12 by communication, with the voltage command values for determination, and determines whether or not an abnormality occurred in the voltage command value calculation unit for control 121.

When the second arithmetic processor 12 can receive the current command values and the like normally from the first arithmetic processor 11 and the processing circuit of the second arithmetic processor 12 (the voltage command value calculation unit for control 121) is operating normally, the voltage command values for determination should coincide with the voltage command values for control. On the other hand, when the voltage command values for determination deviate from voltage command values for control, the abnormality may have occurred in the second arithmetic processor 12 (the voltage command value calculation unit for control 121). According to the above configuration, by comparing the voltage command values for control with the voltage command values for determination, it can be determined whether or not the abnormality occurred in the voltage command value calculation unit for control 121.

Since the voltage command value calculation unit for determination 112 and the abnormality determination unit 113 are provided in the first arithmetic processor 11 which is provided with the control parameter calculation unit 111 which calculates the current command values on the rotating coordinate system of d-axis and q-axis, the abnormality of the voltage command value calculation unit for control 121 which calculates the voltage command values for control on the rotating coordinate system of d-axis and q-axis can be determined by other first arithmetic processors 11, without adding a new arithmetic processor for abnormality detection. Since the abnormality is determined using the voltage command values on the rotating coordinate system of d-axis and q-axis which are DC components, it is not necessary to determine the abnormality at a calculation period shorter than the AC period, and the abnormality of the voltage command value calculation unit for control 121 can be determined, without accelerating the first calculation period T1 of the first arithmetic processor 11.

When determining that the abnormality occurred, the abnormality determination unit 113 transmits the occurrence of abnormality to the control parameter calculation unit 111, the external controller 16, the second arithmetic processor 12 and the like, and makes each unit perform a control at the occurrence of abnormality. For example, the control parameter calculation unit 111 sets the current command values to 0. The second arithmetic processor 12 (the switching control unit 122) performs all phase OFF control that turns off all the switching devices, or a three-phase windings short circuit control that turns off one of all positive electrode side switching devices and all negative electrode side switching devices and turns on the other.

In the present embodiment, when a state where an absolute value of a deviation of voltage command value ΔVref which is a deviation between the voltage command value for control and the voltage command value for determination exceeded a determination value Vth continues for a determination time Terr or more, the abnormality determination unit 113 determines that the abnormality occurred in the voltage command value calculation unit for control 121.

In the present embodiment, the abnormality determination unit 113 sets the determination value Vth and the determination time Terr to fixed values.

The abnormality determination is performed about each of the voltage command values for control of d-axis and q-axis. Specifically, as shown in the next equation, when a state where an absolute value of a deviation of voltage command value of d-axis ΔVdref which is a deviation between the voltage command value for control of d-axis Vdref2 and the voltage command value for determination of d-axis Vdref1 exceeded a determination value of d-axis Vdth continues for the determination time Terr or more, the abnormality determination unit 113 determines that the abnormality occurred in the voltage command value calculation unit for control 121. When a state where an absolute value of a deviation of voltage command value of q-axis ΔVgref which is a deviation between the voltage command value for control of q-axis Vqref2 and the voltage command value for determination of q-axis Vqref1 exceeded a determination value of q-axis Vqth continues for the determination time Terr or more, the abnormality determination unit 113 determines that the abnormality occurred in the voltage command value calculation unit for control 121. Accordingly, when determining that the abnormality occurred in either one of the voltage command values for control of d-axis and q-axis, the abnormality determination unit 113 determines that the abnormality occurred in the voltage command value calculation unit for control 121. And, when determining that the abnormality does not occur in both of the voltage command values for control of d-axis and q-axis, the abnormality determination unit 113 determines that the abnormality does not occur in the voltage command value calculation unit for control 121. The abnormality determination may be performed for one of the voltage command values for control of d-axis and q-axis. The determination time Terr may be individually set for each of d-axis and q-axis.

$$|\Delta Vdref| = |Vdref2 - Vdref1|$$

$$|\Delta Vgref| = |Vqref2 - Vqref1| \tag{7}$$

About each of the voltage command values of d-axis and q-axis, the abnormality determination unit 113 determines whether or not the absolute value of the deviation of voltage command value ΔVref exceeds the determination value Vth every first calculation period T1; counts up a counter value Cout corresponding to the duration time, when the absolute value exceeds the determination value Vth; resets or counts down the counter value Cout, when the absolute value does not exceed the determination value Vth; and determines that the abnormality occurred in the voltage command value calculation unit for control 121, when the counter value Cout exceeds a counter determination value Cth corresponding to the determination time Terr.

Depending on the operating environment or the peripheral environment of the rotary electric machine 1, a transient noise is generated, and when the noise is accumulated, the abnormality may be erroneously determined. According to the above configuration, since the counter value Cout is reset or counted down, it can be suppressed that the counter value Cout is counted up by the noise and the abnormality is erroneously determined. On the other hand, even though the abnormality occurred, the absolute value of the deviation of voltage command value ΔVdref does not exceed the determination value Vth by the noise, and the counter value Cout may be reset unintentionally. In this case, by counting down, the counter value Cout can be prevented from being reset by the noise component, and the accuracy of abnormality determination can be improved.

<Flowchart>

Figure 5:
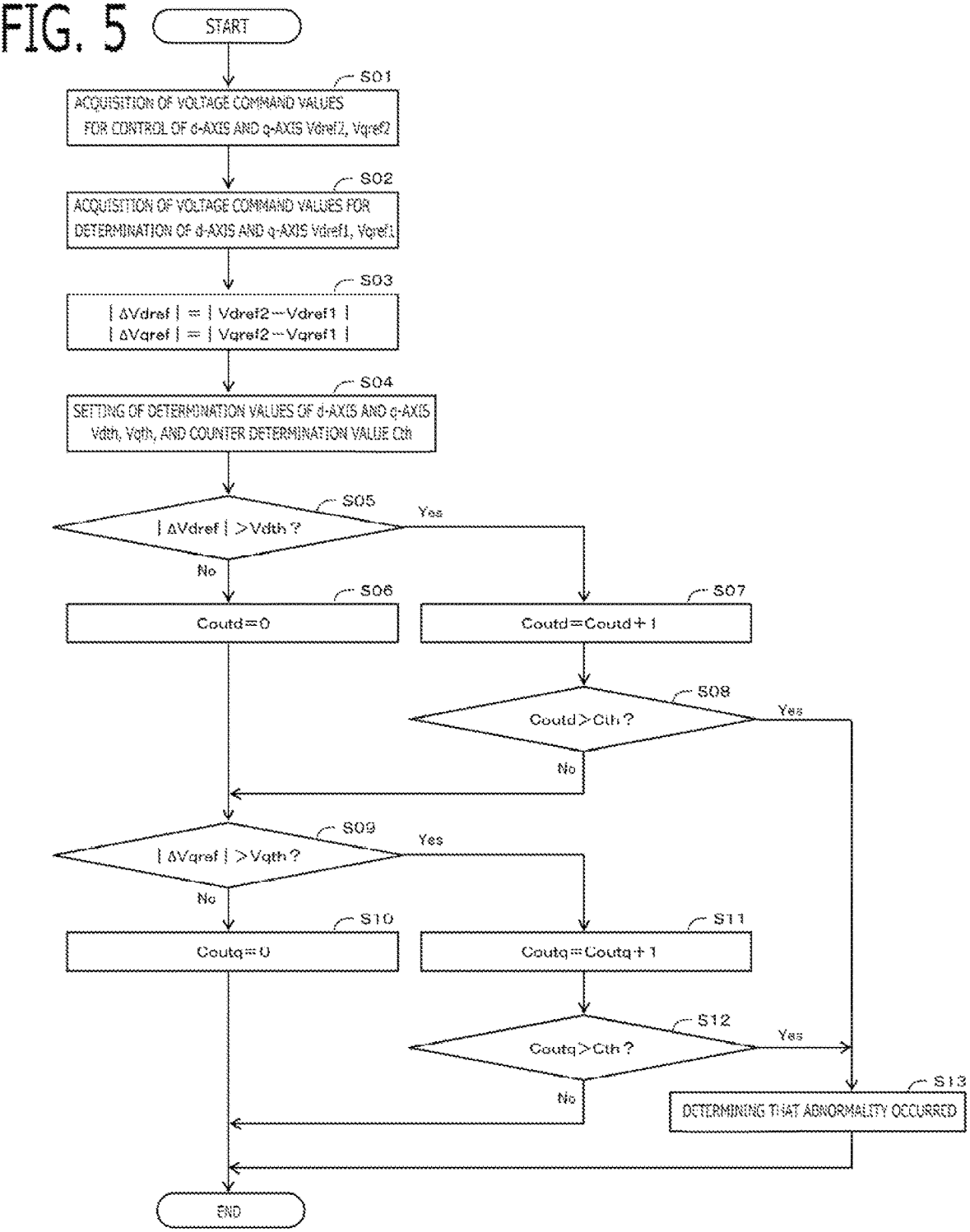
FIG. 5 is a flowchart of processing of the abnormality determination unit according to Embodiment 1.

The processing of the abnormality determination unit 113 will be explained with reference to the flowchart shown in FIG. 5. The processing of the flowchart of FIG. 5 is performed every first calculation period T1. In the step S01, the abnormality determination unit 113 acquires the voltage command values for control of d-axis and q-axis Vdref2, Vqref2 from the second arithmetic processor 12 (the voltage command value calculation unit for control 121). The voltage command values for control calculated in the newest first calculation period T1 are acquired.

In the step S02, the abnormality determination unit 113 acquires the voltage command values for determination of d-axis and q-axis Vdref1, Vqref1 from the voltage command value calculation unit for determination 112. The voltage command values for determination calculated immediately before are acquired.

In the step S03, as shown in the equation (7), the abnormality determination unit 113 calculates the absolute value of the deviation of voltage command value of d-axis ΔVdref which is a deviation between the voltage command value for control of d-axis Vdref2 and the voltage command value for determination of d-axis Vdref1, and the absolute value of the deviation of voltage command value of q-axis ΔVgref which is a deviation between the voltage command value for control of q-axis Vqref2 and the voltage command value for determination of q-axis Vqref1.

In the step S04, the abnormality determination unit 113 sets the determination value Vth (in this example, the determination value of d-axis Vdth and the determination value of q-axis Vqth) and the determination time Terr (in this example, the counter determination value Cth). In the present embodiment, the determination value Vth and the determination time Terr are set to fixed values.

In the step S05, the abnormality determination unit 113 determines whether or not the absolute value of the deviation of voltage command value of d-axis ΔVdref exceeded the determination value of d-axis Vdth. When not exceeding, it advances to the step S06, and when exceeding, it advances to the step S07.

In the step S06, the abnormality determination unit 113 resets the counter value of d-axis Coutd to 0. The abnormality determination unit 113 may count down the counter value of d-axis Coutd (Coutd=Coutd−1).

On the other hand, in the step S07, the abnormality determination unit 113 counts up the counter value of d-axis Coutd (Coutd=Coutd+1). After that, in the step S08, the abnormality determination unit 113 determines whether or not the counter value of d-axis Coutd exceeded the counter determination value Cth. When exceeding, it advances to the step S13, and when not exceeding, it advances to the step S09.

In the step S09, the abnormality determination unit 113 determines whether or not the absolute value of the deviation of voltage command value of q-axis ΔVgref exceeded the determination value of q-axis Vqth. When not exceeding, it advances to the step S10, and when exceeding, it advances to the step S11.

In the step S10, the abnormality determination unit 113 resets the counter value of q-axis Coutq to 0. The abnormality determination unit 113 may count down the counter value of q-axis Coutq (Coutq=Coutq−1).

On the other hand, in the step S11, the abnormality determination unit 113 counts up the counter value of q-axis Coutq (Coutq=Coutq+1). After that, in the step S12, the abnormality determination unit 113 determines whether or not the counter value of q-axis Coutq exceeded the counter determination value Cth. When exceeding, it advances to the step S13, and when not exceeding, it ends the processing.

In the step S13, the abnormality determination unit 113 determines that the abnormality occurred. Then, the abnormality determination unit 113 transmits the occurrence of abnormality to the control parameter calculation unit 111, the external controller 16, the second arithmetic processor 12 and the like, and makes each unit perform a control at the occurrence of abnormality.

<Control Behavior>

Figure 6:
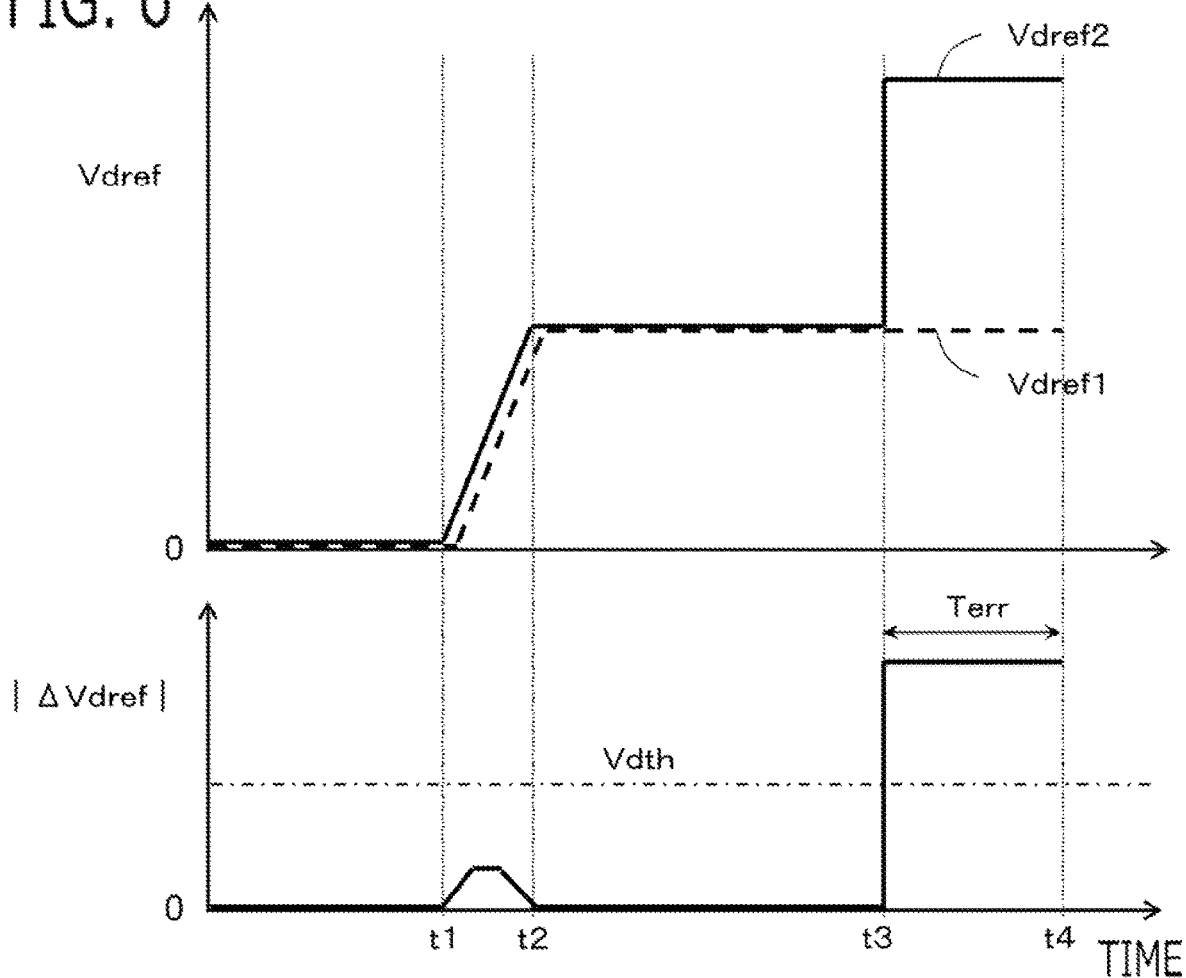
FIG. 6 is a time chart for explaining the abnormality determination behavior according to Embodiment 1.

An example of control behavior will be explained using the time chart of FIG. 6. The voltage command value of d-axis is shown as the representative in FIG. 6. Until the time t1, the torque command value To is 0, and the voltage command values for determination and for control of d-axis Vdref1, Vdref2 are set to 0. At the time t1, the torque command value is increased to a specified value, and the current command value is increased to a specified value. From the time t1 to the time t2, by the current feedback control, the voltage command values for determination and for control of d-axis Vdref1, Vdref2 are increasing gradually to specified values. From the time t1 to the time t2, it becomes a transient state where current is increasing, and the deviation of voltage command value of d-axis ΔVdref is generated by a deviation of calculation period between the first calculation period T1 and the second calculation period T2, and a delay due to communication. However, the absolute value of the deviation of voltage command value of d-axis ΔVdref is less than determination value of d-axis Vdth, and it is determined normally that the abnormality does not occur.

At the time t3, abnormality occurs in the voltage command value calculation unit for control 121, and the voltage command value for control of d-axis Vdref2 is increased stepwise to a specified value. Accordingly, at the time t3, the absolute value of the deviation of voltage command value of d-axis ΔVdref is increased stepwise, and exceeds the determination value of d-axis Vdth. Then, at the time t4, a state where the absolute value exceeded the determination value of d-axis Vdth continued the determination time Terr or more. The abnormality determination unit 113 determines that the abnormality occurred, and performs the processing at the occurrence of abnormality.

<First Calculation Period T1 and Second Calculation Period 12>

As mentioned above, the first calculation period T1 is longer than the second calculation period T2. Since the second arithmetic processor 12 needs to calculate at the PWM period shorter than the AC period, it needs to operate at high speed. On the other hand, since the first arithmetic processor 11 calculates the current command values on the rotating coordinate system of d-axis and q-axis which are the DC components, it does not need to calculate at a period shorter than the AC period, and a calculation period can be set longer.

In the present embodiment, since the abnormality is determined using the voltage command values on the rotating coordinate system of d-axis and q-axis which are the DC components, it is not necessary to determine the abnormality at the second calculation period T2 shorter than the AC period, and the abnormality can be determined using the first arithmetic processor 11 which calculates at the first calculation period T1 longer than the second calculation period T2. That is to say, the abnormality of the second arithmetic processor 12 which operates at higher speed can be determined using the first arithmetic processor 11 which operates at lower speed. It is not necessary to accelerate the calculation period of the first arithmetic processor 11, and the high cost of the first arithmetic processor 11 can be suppressed.

In the present embodiment, although an abnormality determining means of the first arithmetic processor 11 is not described, various well-known technology, for example, the dual-core lockstep of microcomputer, may be used. As an abnormality determining means of the input circuit 13, various well-known technology, for example, the method using a total current of the current sensors, may be used. As an abnormality determining means of the switching control unit 122, various well-known technology, for example, the shoot through current preventing function of pre-driver, may be used.

2. Embodiment 2

The controller 10 according to Embodiment 2 will be explained. The explanation for constituent parts the same as those in Embodiment 1 will be omitted. The basic configuration of the rotary electric machine 1, the electric power converter 4, and the controller 10 according to the present embodiment is the same as that of Embodiment 1. The setting method of the determination value Vth is different from Embodiment 1.

In the present embodiment, the abnormality determination unit 113 sets the determination value Vth variably, using one or more of a plurality of setting methods explained in the following.

The abnormality determination unit 113 sets the determination value Vth based on an absolute value of the current command value. According to this configuration, the appropriate determination value Vth is set based on the absolute value of the current command value, and the determination accuracy can be improved. Alternatively, instead of the absolute value of the current command value, the abnormality determination unit 113 may set the determination value Vth, based on an absolute value of voltage command value for determination.

For example, by referring to a determination value setting map data in which a relation between the absolute value of the current command value Iref and the determination value Vth is preliminarily set, the abnormality determination unit 113 calculates the determination value Vth corresponding to the absolute value of present current command value Iref. Alternatively, using a preliminarily set equation, the determination value Vth may be calculated based on the absolute value of the current command value.

<Monotonic Decrease Setting>

Figure 7:
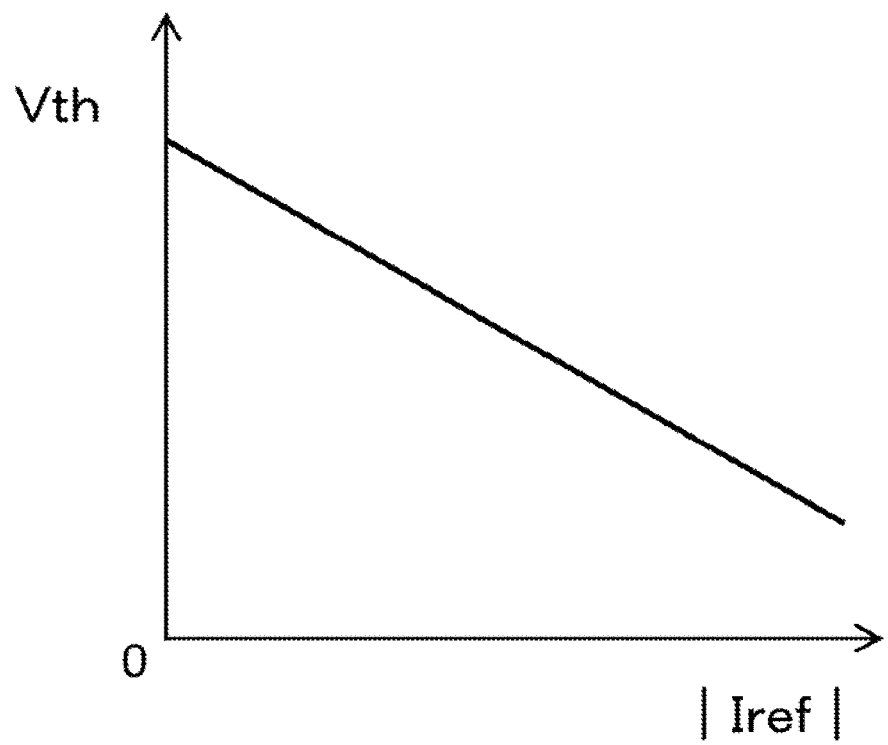
FIG. 7 is a figure for explaining setting of the determination value according to Embodiment 2.

As shown in FIG. 7, the abnormality determination unit 113 gradually decreases the determination value Vth as the absolute value of the current command value Iref increases.

When the absolute value of the current command value is large, the current which flows into the armature windings becomes large, and the output torque also becomes large. In this state, when the abnormality occurs in the voltage command value calculation unit for control 121, a large abnormal torque will be generated. According to the above configuration, since the determination value Vth gradually decreases as the absolute value of the current command value increases, the abnormality can be detected easily, and generation of large abnormal torque can be suppressed.

Figure 8:
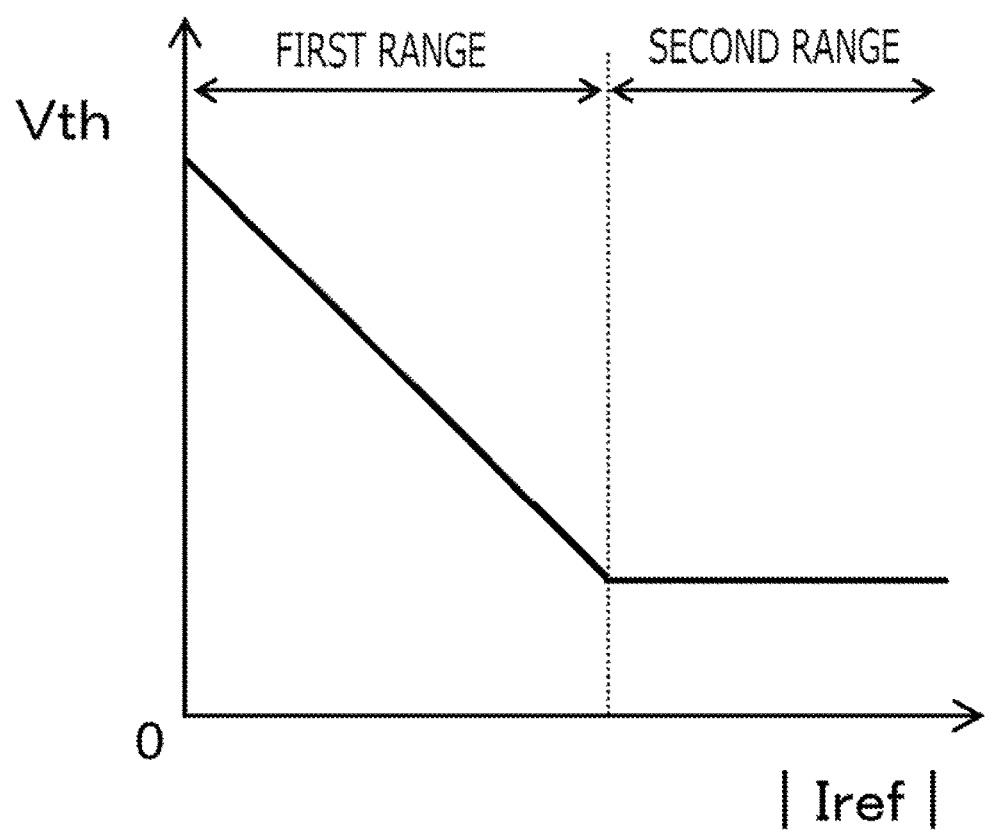
FIG. 8 is a figure for explaining setting of the determination value according to Embodiment 2.

As shown in FIG. 8, in a first range of the absolute value of the current command value, the abnormality determination unit 113 gradually decreases the determination value Vth as the absolute value of the current command value Iref increases. Then, in a second range of the absolute value of the current command value which is different from the first range, the abnormality determination unit 113 may set the determination value Vth to a fixed value. The second range is set to a range higher than the first range. The second range may be set also to a range lower than the first range.

In the range where the absolute value of the current command value is large, the determination value Vth is set to a too small value by the monotonic decrease, and the abnormality may be erroneously determined due to the noise component included in the absolute value of the deviation of voltage command value ΔVref. According to the above configuration, since the determination value Vth is set to the fixed value in the second range, the determination value Vth can be prevented from being set to a too small value by the monotonic decrease, and the erroneous determination due to the noise component can be suppressed.

<Monotonic Increase Setting>

Figure 9:
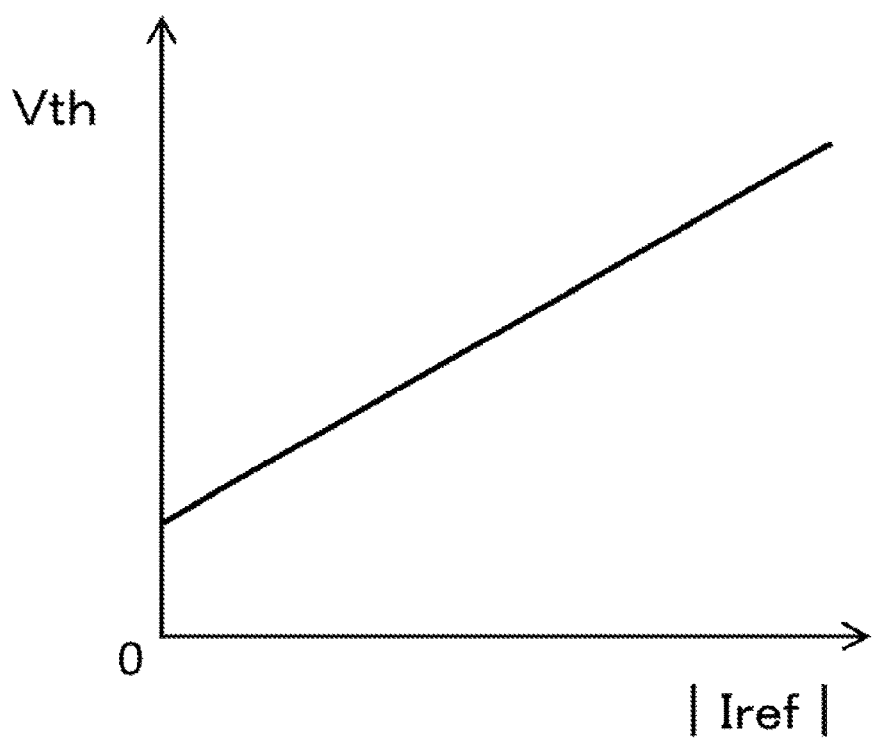
FIG. 9 is a figure for explaining setting of the determination value according to Embodiment 2.

Alternatively, as shown in FIG. 9, the abnormality determination unit 113 may gradually increase the determination value Vth as the absolute value of the current command value Iref increases.

In the case where the current sensor 6 has a gain error, a current detection error becomes large as the current becomes large. Even if the abnormality does not occur, the absolute value of the deviation of voltage command value ΔVref tends to become large, and the abnormality is easily determined. According to the above configuration, since the determination value Vth is gradually increased as the absolute value of the current command value increases, in the case where the current sensor 6 has the gain error, even if the abnormality does not occur, it can be suppressed that the abnormality is erroneously determined.

Figure 10:
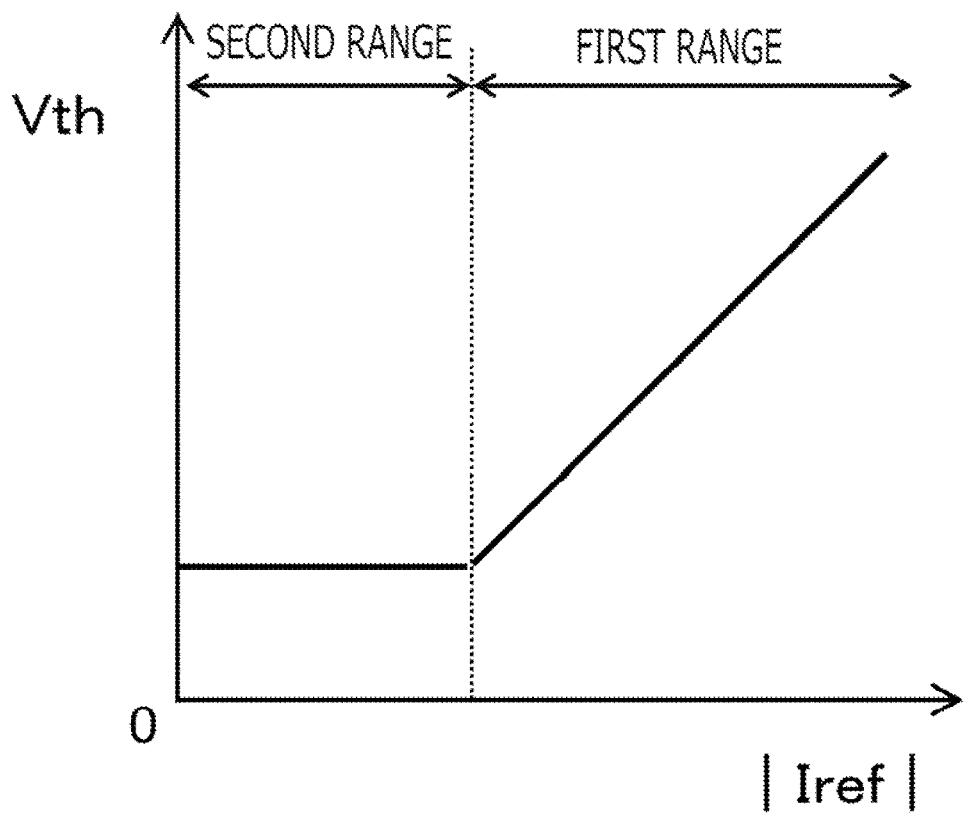
FIG. 10 is a figure for explaining setting of the determination value according to Embodiment 2.

As shown in FIG. 10, in the first range of the absolute value of the current command value, the abnormality determination unit 113 gradually increases the determination value Vth as the absolute value of the current command value increases. In a second range of the absolute value of the current command value which is different from the first range, the abnormality determination unit 113 may set the determination value Vth to a fixed value. The second range is set to a range lower than the first range. The second range may be set also to a range higher than the first range.

In the range where the absolute value of the current command value is small, the determination value Vth is set to a too small value by the monotonic increase, and the abnormality may be erroneously determined due to the noise component included in the absolute value of the deviation of voltage command value ΔVref. According to the above configuration, since the determination value Vth is set to the fixed value in the second range, the determination value Vth can be prevented from being set to a too small value by the monotonic increase, and the erroneous determination due to the noise component can be suppressed.

<Setting of Determination Value of d-Axis and Determination Value of q-Axis>

In the present embodiment, about each of the determination value of d-axis Vdth and the determination value of q-axis Vqth, the setting based on the absolute value of the current command value is performed. Specifically, the abnormality determination unit 113 sets the determination value of d-axis Vdth based on an absolute value of the current command value of d-axis Idref, and sets the determination value of q-axis Vqth based on an absolute value of the current command value of q-axis Iqref. Since either one of the methods mentioned above is used, explanation of the setting method is omitted. This calculation is performed in the step S04 of the flowchart of FIG. 5 of Embodiment 1. Alternatively, instead of the absolute value of the current command value of d-axis Idref, the abnormality determination unit 113 may set the determination value of d-axis Vdth based on an absolute value of the voltage command value for determination of d-axis Vdref1. Instead of the absolute value of the current command value of q-axis Iqref, the abnormality determination unit 113 may set the determination value of q-axis Vqth based on the absolute value of voltage command value for determination of q-axis Vqref1.

<Change of Determination Value According to Positive or Negative of Current Command Value>

The abnormality determination unit 113 may set the determination value of q-axis Vqth differently according to whether the current command value is a positive value or a negative value. Alternatively, in the case where the voltage command value for determination is used instead of the current command value, the abnormality determination unit 113 may set the determination value of q-axis Vqth differently according to whether the voltage command value for determination is a positive value or a negative value.

For example, since the magnetic saturation easily occurs in the region where the current of d-axis is positive, a current change and a torque change when inductance decreases and abnormal voltage is applied become large. On the other hand, since the magnetic saturation hardly occurs in the region where the current of d-axis is negative, a current change and a torque change when abnormal voltage is applied become small compared with the positive region. In this case, by setting the determination value of d-axis Vdth of the positive region is set lower than the determination value of d-axis Vdth of the negative region, a margin to abnormal torque can be optimized.

Even when rotating in the same direction, in the positive region where the current of q-axis becomes the motoring side, the determination value of q-axis Vqth is set based on the torque command value or the current command value of q-axis Iqref, and in the negative region where the current of q-axis becomes the regenerative side, the determination value of q-axis Vqth is set based on the generation current. In this way, by setting the determination value of q-axis Vqth differently, the accuracy of abnormality determination can be improved.

<Change of Determination Value According to Rotational Speed>

The voltage equation in steady state is expressed by the next equation.

$$Vd = Ra \times Id - \omega \times Lq \times Iq$$

$$Vq = Ra \times Iq + \omega \times (Ld \times Id + \psi) \quad (8)$$

Herein, Vd is a voltage of d-axis, Ra is a resistance value of the armature winding, Id is a current of d-axis, co is a rotational angle speed in the electrical angle of the rotor, Lq is an inductance of q-axis, Iq is a current of q-axis, Vq is a voltage of q-axis, Ld is an inductance of d-axis, and $\psi$ is an interlinkage flux of the rotor magnet.

When the rotational angle speed $\omega$ is large, the voltage equation becomes the next equation.

$$Vd \approx -\omega \times Lq \times Iq \rightarrow Iq \approx -Vd/(\omega \times Lq)$$

$$Vq \approx \omega(Ld \times Id + \psi) \rightarrow Id \approx (Vq/\omega - \psi)/Ld \quad (9)$$

Therefore, when the similar abnormality deviation is generated in the voltage command value for control of d-axis or q-axis Vdref2, Vqref2, in the region where the rotational angle speed $\omega$ is large, the current change becomes comparatively small, but in the region where the rotational angle speed $\omega$ is small, the current change becomes comparatively large, and large abnormal torque is generated.

Then, the abnormality determination unit 113 sets the determination value Vth, based on the rotational speed of the rotary electric machine 1. According to this configuration, variation of the output torque at the time of abnormality determination can be optimized against the change of rotational angle speed $\omega$.

For example, the abnormality determination unit 113 decreases the determination value Vth as the rotational angle speed $\omega$ decreases. By setting in this way, since the comparatively small determination value Vth is used in the region where the rotational angle speed $\omega$ is small, it can be suppressed that variation of the output torque at the time of abnormality determination becomes large too much.

For example, by referring to a determination value setting map data in which a relation between the rotational angle speed co, the absolute value of the current command value Iref, and the determination value Vth is preliminarily set, the abnormality determination unit 113 calculates the determination value Vth corresponding to the present rotational angle speed $\omega$ and the absolute value of the present current command value Iref. Alternatively, using the preliminarily set equation, the determination value Vth may be set.

Alternatively, from a plurality of determination value setting map data in each of which a relation between the absolute value of the current command value Iref and the determination value Vth is preliminarily set for each of a plurality of rotational angle speed regions, the abnormality determination unit 113 may select the determination value setting map data of the rotational angle speed region corresponding to the present rotational angle speed $\omega$; and by referring to the selected determination value setting map data, may calculate the determination value Vth corresponding to the absolute value of the present current command value Iref. Alternatively, using equations which are set for a plurality of rotational angle speed regions, the determination value Vth may be set.

Alternatively, the abnormality determination unit 113 may change the determination value Vth based on the rotational speed of the rotary electric machine 1, but may not change the determination value Vth based on the absolute value of the current command value Iref.

3. Embodiment 3

The controller 10 according to Embodiment 3 will be explained. The explanation for constituent parts the same as that of Embodiment 1 or 2 will be omitted. The basic configuration of the rotary electric machine 1, the electric power converter 4, and the controller 10 according to the present embodiment is the same as that of Embodiment 1 or 2. The setting method of the determination time Terr is different from Embodiment 1 or 2.

In the present embodiment, the abnormality determination unit 113 sets the determination time Terr variably, using one or more of a plurality of setting methods explained in the following.

<Setting According to Deviation of Voltage Command Value>

The abnormality determination unit 113 decreases the determination time Terr (in this example, the counter determination value Cth) as the absolute value of the deviation of voltage command value ΔVref increases.

The variation amount of output torque becomes large as the absolute value of the deviation of voltage command value ΔVref increases. According to the above configuration, when the variation amount of the output torque is large, the abnormality can be determined at an early stage and the processing at the time of abnormality determination can be performed.

In the present embodiment, the determination time Terr is individually set for each of d-axis and q-axis. That is, when a state where the absolute value of the deviation of voltage command value of d-axis ΔVdref exceeded the determination value of d-axis Vdth continues for a determination time of d-axis Terrd or more, the abnormality determination unit 113 determines that the abnormality occurred in the voltage command value calculation unit for control 121. When a state where the absolute value of the deviation of voltage command value of q-axis ΔVgref exceeded the determination value of q-axis Vqth continues for a determination time of q-axis Terrq or more, the abnormality determination unit 113 determines that the abnormality occurred in the voltage command value calculation unit for control 121.

Figure 11:
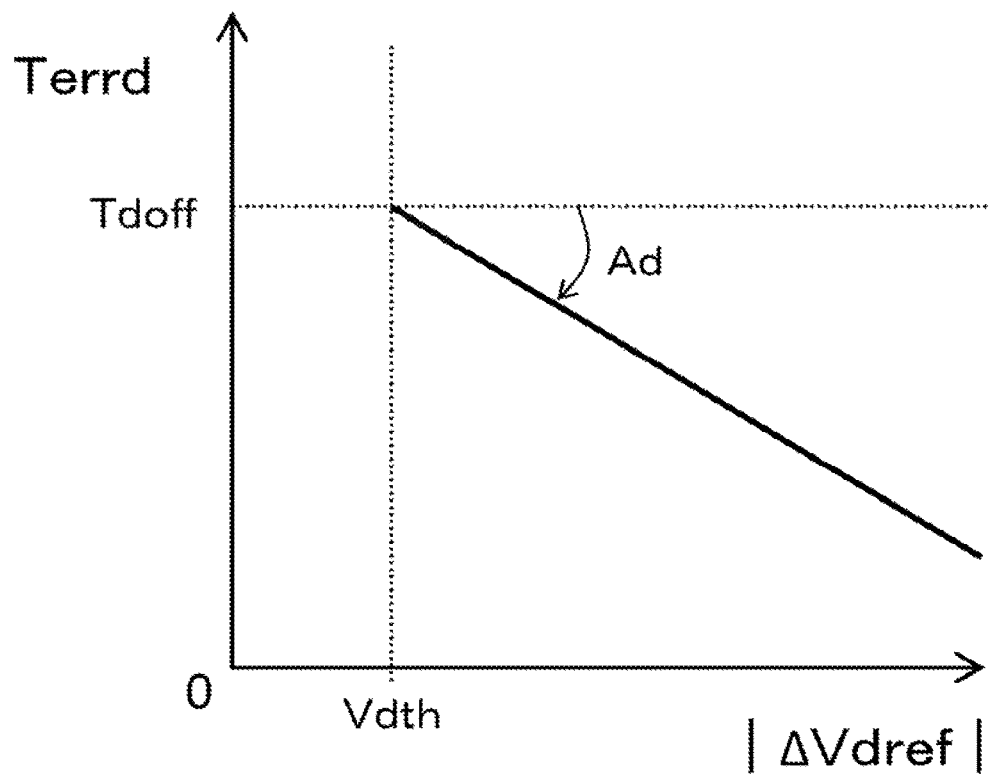
FIG. 11 is a figure for explaining setting of the determination time of d-axis according to Embodiment 3.
Figure 12:
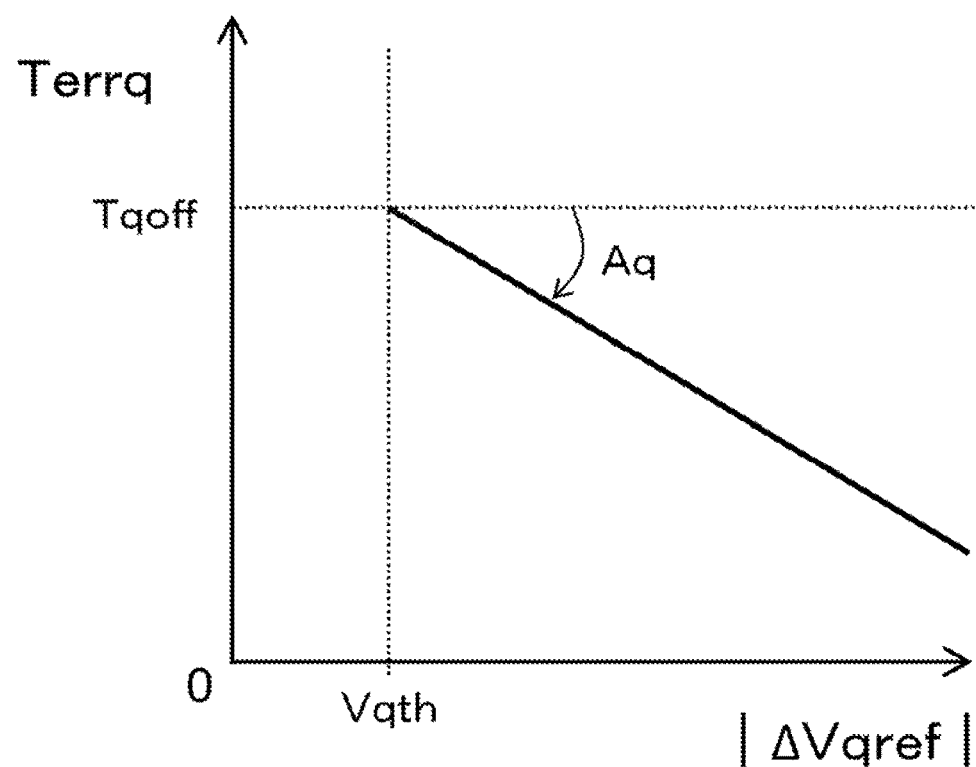
FIG. 12 is a figure for explaining setting of the determination time of q-axis according to Embodiment 3.

Then, as shown in FIG. 11, the abnormality determination unit 113 decreases the determination time of d-axis Terrd (in this example, a counter determination value of d-axis Cthd) as the absolute value of the deviation of voltage command value of d-axis ΔVdref increases. As shown in FIG. 12, the abnormality determination unit 113 decreases the determination time of q-axis Terrq (in this example, a counter determination value of q-axis Cthq) as the absolute value of the deviation of voltage command value of q-axis ΔVgref increases. This calculation is performed in the step S04 of the flowchart of FIG. 5 of Embodiment 1.

For example, the abnormality determination unit 113 sets the determination times of d-axis and q-axis Terrd, Terrq, using the preliminarily set equation as shown in the next equation.

$$Terrd = Ad \times (|\Delta Vdref| - Vdth) + Tdoff$$

$$Terrq = Aq \times (|\Delta Vqref| - Vqth) + Tqoff \qquad (10)$$

Herein, Ad and Aq are preliminarily set inclinations, Tdoff and Tqoff are determination times corresponding to the determination values Vdth and Vqth. A higher order equation may be used.

Alternatively, by referring to d-axis determination time map data in which a relation between the absolute value of the deviation of voltage command value of d-axis ΔVdref and the determination time of d-axis Terrd is preliminarily set, the abnormality determination unit 113 may calculate the determination time of d-axis Terrd corresponding to the absolute value of the present deviation of voltage command value of d-axis ΔVdref. By referring to q-axis determination time map data in which a relation between the absolute value of the deviation of voltage command value of q-axis ΔVgref and the determination time of q-axis Terrq is preliminarily set, the abnormality determination unit 113 may calculate the determination time of q-axis Terrq corresponding to the absolute value of the present deviation of voltage command value of q-axis ΔVgref.

Examples of control behavior will be explained using the time charts of FIG. 13 and FIG. 14. FIG. 13 shows an example when the absolute value of the deviation of voltage command value of d-axis ΔVdref at the time of abnormality occurrence is small. FIG. 14 shows an example when the absolute value of the deviation of voltage command value of d-axis ΔVdref at the time of abnormality occurrence is large.

FIG. 13 will be explained. Until the time t11, the abnormality does not occur and the voltage command value for determination of d-axis Vdref1 and the voltage command value for control of d-axis Vdref2 coincide with each other, the absolute value of the deviation of voltage command value of d-axis ΔVdref is less than the determination value of d-axis Vdth, and the counter value of d-axis Coutd becomes 0.

At the time t11, abnormality occurs in the voltage command value calculation unit for control 121, and the voltage command value for control of d-axis Vdref2 increases stepwise, and the absolute value of the deviation of voltage command value of d-axis ΔVdref increases stepwise and exceeds the determination value of d-axis Vdth. However, in this example, since the absolute value of the deviation of voltage command value of d-axis ΔVdref is small, the determination time of d-axis Terrd (in this example, the counter determination value of d-axis Cthd) is set to a comparatively large value.

After the time t11, the counter value of d-axis Coutd is counted up. At the time t12, the counter value of d-axis Coutd exceeds the counter determination value of d-axis Cthd which is set to a comparatively large value, and it is determined that the abnormality occurred.

FIG. 14 will be explained. Until the time t21, the abnormality does not occur and the voltage command value for determination of d-axis Vdref1 and the voltage command value for control of d-axis Vdref2 coincide with each other, the absolute value of the deviation of voltage command value of d-axis ΔVdref is less than the determination value of d-axis Vdth, and the counter value of d-axis Coutd becomes 0.

At the time t21, abnormality occurs in the voltage command value calculation unit for control 121, and the voltage command value for control of d-axis Vdref2 increases stepwise, the absolute value of the deviation of voltage command value of d-axis ΔVdref increases stepwise, and exceeds the determination value of d-axis Vdth. In this example, since the absolute value of the deviation of voltage command value of d-axis ΔVdref is larger than FIG. 13, the determination time of d-axis Terrd (in this example, the counter determination value of d-axis Cthd) is set to a value smaller than FIG. 13.

After the time t21, the counter value of d-axis Coutd is counted up. At the time t22 earlier than the time t12 of FIG. 13, the counter value of d-axis Coutd exceeds the counter determination value of d-axis Cthd which is set to a comparatively small value, and it is determined that the abnormality occurred. In this way, when the absolute value of the deviation of voltage command value of d-axis ΔVdref is large and the variation amount of output torque is large, the abnormality can be determined at an early stage, and the processing at the time of abnormality determination can be performed.

<Setting of Determination Time According to Absolute Value of Voltage Command Value>

The abnormality determination unit 113 may set the determination time Terr, based on the absolute value of the voltage command value for control, or the absolute value of the voltage command value for determination. For example, the abnormality determination unit 113 decreases or increases the determination time Terr as the absolute value of the voltage command value for control or the absolute value of the voltage command value for determination increases.

In the present embodiment, the abnormality determination unit 113 sets the determination time of d-axis Terrd, based on the absolute value of the voltage command value for control of d-axis Vdref2, or the absolute value of the voltage command value for determination of d-axis Vdref1. The abnormality determination unit 113 sets the determination time of q-axis Terrq, based on the absolute value of the voltage command value for control of q-axis Vqref2, or the absolute value of the voltage command value for determination of q-axis Vqref1.

Alternatively, by combining two setting methods, the abnormality determination unit 113 may increase or decrease the determination time Terr, based on the absolute value of the voltage command value for control or the absolute value of the voltage command value for determination, and may decrease the determination time as the absolute value of the deviation ΔVref between the voltage command value for control and the voltage command value for determination increases.

<Change of Determination Time According to Rotational Speed>

As explained in Embodiment 2, when the similar abnormality deviation is generated in the voltage command values for control of d-axis or q-axis Vdref2, Vqref2, the current change becomes comparatively small in the region where the rotational angle speed ω is large, but the current change becomes comparatively large in the region where the rotational angle speed ω is small, and large abnormal torque is generated.

Then, the abnormality determination unit 113 may set the determination time Terr, based on the rotational speed of the rotary electric machine. For example, the abnormality determination unit 113 decreases the determination time Terr as the rotational angle speed ω decreases. By setting in this way, since the comparatively small determination time Terr is used in the region where the rotational angle speed ω is small, the abnormality is determined at an early stage, and a large abnormal torque can be prevented from generating for a long period of time. On the other hand, in the region where the rotational angle speed ω is large, since the influence of abnormal torque becomes small, the comparatively large determination time Terr can be set.

For example, by referring to determination value setting map data in which a relation between the rotational angle speed ω, the absolute value of the deviation of current command value ΔVref, and the determination time Terr is preliminarily set, the abnormality determination unit 113 calculates the determination time Terr corresponding to the present rotational angle speed ω and the present deviation of current command value ΔVref.

4. Other Embodiments

The rotary electric machine 1 may be a field winding type synchronous rotary electric machine in which the field winding is provided in the rotor, or may be an induction rotary electric machine in which a cage type electric conductor is provided in the rotor. Even in these case, since the voltage command values for control on the rotating coordinate system of d-axis and q-axis are calculated, the abnormality can be determined.

The stator may be provided with plural-phase armature windings other than three-phase (for example, two-phase, four-phase).

The stator is provided with plural pairs (for example, two pairs) of three-phase armature windings, and each part of the electric power converter and the controller may be provided corresponding to the three-phase armature windings of each pair.

The first arithmetic processor 11 may be a processing circuit other than CPU and the storage apparatus, for example, ASIC or FPGA. The second arithmetic processor 12 may be a processing circuit other than ASIC or FPGA, for example, CPU and the storage apparatus. The first arithmetic processor 11 and the second arithmetic processor 12 may be first CPU and storage apparatus, and second CPU and storage apparatus which are provided in a microcomputer having a plurality of CPU cores; and these may be a system which transmits and receives data by inter-core communication.

The voltage command value calculation unit for control 121 or the control parameter calculation unit 111 may estimate the rotational angle (the magnetic pole position) without using the rotation sensor, based on current information which are obtained by superimposing a harmonic wave component on the current command value (so-called, sensorless system). Then, the information on the estimated rotational angle θ may be transmitted by communication between the voltage command value calculation unit for control 121 and the control parameter calculation unit 111.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Rotary Electric Machine, 4: Electric Power Converter, 10: Controller for Rotary Electric Machine, 11: First Arithmetic Processor, 12: Second Arithmetic Processor, 111: Control Parameter Calculation Unit, 112: Voltage Command Value Calculation Unit for Determination, 113: Abnormality Determination Unit, 121: Voltage Command Value Calculation Unit for Control, 122: Switching Control Unit, Cout: Counter value, Cth: Counter determination value, Idref: Current Command Value of d-axis, Iqref: Current Command Value of q-axis, T1: First calculation period, T2: Second calculation period, Terr: Determination time, Vdref1: Voltage command value for determination of d-axis, Vqref1: Voltage command value for determination of q-axis, Vdref2: Voltage command value for control of d-axis, Vqref2: Voltage command value for control of q-axis, Vth: Determination Value, ΔVref: Deviation of voltage command value

What is claimed is:

1. A controller for rotary electric machine which controls a rotary electric machine having plural-phase armature windings via an electric power converter, the controller for rotary electric machine comprising:
   a first arithmetic processor, and
   a second arithmetic processor that communicates with the first arithmetic processor,
   wherein the first arithmetic processor is provided with a control parameter calculator that calculates current command values on a rotating coordinate system of d-axis and q-axis which rotates synchronizing with rotation of a rotor of the rotary electric machine in an electrical angle,
   wherein the second arithmetic processor is provided with a voltage command value calculator for control that calculates voltage command values for control on the rotating coordinate system of d-axis and q-axis, based on the current command values acquired from the first arithmetic processor by communication, and
   wherein the first arithmetic processor is provided with a voltage command value calculator for determination which calculates voltage command values for determination on the rotating coordinate system of d-axis and q-axis, based on the current command values; and an abnormality determiner that compares the voltage command values for control acquired from the second arithmetic processor by communication, with the voltage command values for determination, and determines whether or not an abnormality occurred in the voltage command value calculator for control.

2. The controller for rotary electric machine according to claim 1,
   wherein the abnormality determiner determines that the abnormality occurred in the voltage command value calculator for control, when a state where an absolute value of deviation between the voltage command value for control and the voltage command value for determination exceeded a determination value continues for a determination time or more.

3. The controller for rotary electric machine according to claim 2,
wherein the abnormality determiner sets the determination value based on an absolute value of the current command value, or an absolute value of the voltage command value for determination.

4. The controller for rotary electric machine according to claim 2,
wherein the abnormality determiner decreases or increases the determination value gradually, as the absolute value of the current command value or the absolute value of the voltage command values for determination increases.

5. The controller for rotary electric machine according to claim 2,
wherein the abnormality determiner sets the determination value to a fixed value.

6. The controller for rotary electric machine according to claim 2,
wherein, in a first range of the absolute value of the current command value or the absolute value of the voltage command value for determination, the abnormality determiner decreases or increases the determination value gradually, as the absolute value of the current command value or the absolute value of the voltage command value for determination increases; and
in a second range of the absolute value of the current command value or the absolute value of the voltage command value for determination which is different from the first range, the abnormality determiner sets the determination value to a fixed value.

7. The controller for rotary electric machine according to claim 2,
wherein the abnormality determiner makes a setting of the determination value different between a case where the current command value or the voltage command value for determination is a positive value and a case where the current command value or the voltage command value for determination is a negative value.

8. The controller for rotary electric machine according to claim 2,
wherein the abnormality determiner sets the determination value, based on a rotational speed of the rotary electric machine.

9. The controller for rotary electric machine according to claim 2,
wherein the abnormality determiner decreases the determination time, as the absolute value of the deviation between the voltage command value for control and the voltage command value for determination increases.

10. The controller for rotary electric machine according to claim 2,
wherein the abnormality determiner sets the determination time, based on the absolute value of the voltage command value for control or the absolute value of the voltage command value for determination.

11. The controller for rotary electric machine according to claim 2,
wherein the abnormality determiner increases or decreases the determination time, based on the absolute value of the voltage command value for control or the absolute value of the voltage command value for determination; and decreases the determination time, as the absolute value of the deviation between the voltage command value for control and the voltage command value for determination increase.

12. The controller for rotary electric machine according to claim 2,
wherein the abnormality determiner determines whether or not the absolute value of the deviation exceeds the determination value every calculation period;
counts up a counter value corresponding to a duration time, when the absolute value of the deviation exceeds the determination value, and resets or counts down the counter value, when the absolute value of the deviation does not exceed the determination value; and
determines that the abnormality occurred in the voltage command value calculator for control, when the counter value exceeds a counter determination value corresponding to the determination time.

13. The controller for rotary electric machine according to claim 2,
wherein the abnormality determiner sets the determination time, based on the rotational speed of the rotary electric machine.

14. The controller for rotary electric machine according to claim 1,
wherein a calculation period of the first arithmetic processor is longer than a calculation period of the second arithmetic processor.

15. The controller for rotary electric machine according to claim 1,
wherein the voltage command value calculator for control calculates current detection values on the rotating coordinate system of d-axis and q-axis, based on detection values of currents which flow into the plural-phase armature windings, and a rotational angle of the rotor in the electrical angle; and
calculates the voltage command values for control, based on the current detection values, and the current command values acquired from the first arithmetic processor by communication, and
wherein the voltage command value calculator for determination calculates the voltage command values for determination, based on the current detection values acquired from the second arithmetic processor by communication, and the current command values.

16. The controller for rotary electric machine according to claim 15,
wherein the voltage command value calculator for control calculates the voltage command values for control, at least based on integration values for control obtained by performing integral calculations to deviations between the current detection values and the current command values, and
wherein the voltage command value calculator for determination calculates the voltage command values for determination, at least based on integration values for determination obtained by performing integral calculations to deviations between the current detection values and the current command values, or the integration values for control acquired from the voltage command value calculator for control by communication.

17. The controller for rotary electric machine according to claim 1,
wherein the control parameter calculator calculates control gains,
wherein the voltage command value calculator for control calculates the voltage command values for control using the control gains acquired from the first arithmetic processor by communication, and wherein the voltage command value calculator for determination calculates the voltage command values for determination using the control gains.

18. The controller for rotary electric machine according to claim 1,
wherein the second arithmetic processor is provided with a switching controller that turns on and off a plurality of switching devices provided in the electric power converter, based on the voltage command values for control.

* * * * *